US010033469B2

(12) United States Patent
Deng et al.

(10) Patent No.: US 10,033,469 B2
(45) Date of Patent: Jul. 24, 2018

(54) INJECTABLE ACOUSTIC TRANSMISSION DEVICES AND PROCESS FOR MAKING AND USING SAME

(71) Applicants: Battelle Memorial Institute, Richland, WA (US); The United States of America, as represented by the Army Corps of Engineers, Washington, DC (US)

(72) Inventors: Z. Daniel Deng, Richland, WA (US); Mitchell J. Myjak, Richland, WA (US); Thomas J. Carlson, Holmes Beach, FL (US); Jie Xiao, Richland, WA (US); Huidong Li, Richland, WA (US); Samuel S. Cartmell, Richland, WA (US); Jun Lu, Richland, WA (US); Honghao Chen, Ningbo (CN); M. Bradford Eppard, Vancouver, WA (US); Mark E. Gross, Pasco, WA (US)

(73) Assignees: Battelle Memorial Institute, Richland, WA (US); The United States of America, as represented by the Army Corps of Engineers, Washington, DC (US)

( * ) Notice: Subject to any disclaimer, the term of this patent is extended or adjusted under 35 U.S.C. 154(b) by 809 days.

(21) Appl. No.: 14/014,035

(22) Filed: Aug. 29, 2013

(65) Prior Publication Data

US 2015/0063072 A1 Mar. 5, 2015

(51) Int. Cl.
*E21B 47/16* (2006.01)
*H04B 11/00* (2006.01)
(Continued)

(52) U.S. Cl.
CPC ............ *H04B 11/00* (2013.01); *A01K 11/006* (2013.01); *A01K 61/90* (2017.01); *B06B 1/0207* (2013.01);
(Continued)

(58) Field of Classification Search
None
See application file for complete search history.

(56) References Cited

U.S. PATENT DOCUMENTS 3,100,866 A 8/1963 Marks
3,262,093 A 7/1966 Junger et al.
(Continued)

FOREIGN PATENT DOCUMENTS

CA 2091043 9/1994
CN 1424592 8/2003
(Continued)

OTHER PUBLICATIONS

Kogan, Shulim, Gregory Kaduchak, and Dipen N. Sinha. "Acoustic concentration of particles in piezoelectric tubes: Theoretical modeling of the effect of cavity shape and symmetry breaking." The Journal of the Acoustical Society of America 116.4 (2004): 1967-1974.*
(Continued)

*Primary Examiner* — Isam A Alsomiri
*Assistant Examiner* — Jonathan D Armstrong
(74) *Attorney, Agent, or Firm* — Wells St. John P.S.

(57) ABSTRACT

Injectable acoustic tags and a process of making are described for tracking host animals in up to three dimensions. The injectable acoustic tags reduce adverse biological effects and have a reduced cost of manufacture compared with conventional surgically implanted tags. The injectable tags are powered by a single power source with a lifetime of greater than 30 days. The injectable tags have an enhanced
(Continued)

acoustic signal transmission range that enhances detection probability for tracking of host animals.

41 Claims, 10 Drawing Sheets

(51) Int. Cl.
| | |
|---|---|
| B06B 1/06 | (2006.01) |
| G01S 1/72 | (2006.01) |
| A01K 11/00 | (2006.01) |
| B06B 1/02 | (2006.01) |
| H01M 2/16 | (2006.01) |
| H01M 4/133 | (2010.01) |
| H01M 4/66 | (2006.01) |
| H01M 10/052 | (2010.01) |
| H01M 10/0568 | (2010.01) |
| H01M 10/0569 | (2010.01) |
| H01M 10/0587 | (2010.01) |
| A01K 61/90 | (2017.01) |

(52) U.S. Cl.
CPC ............ *B06B 1/0655* (2013.01); *G01S 1/725* (2013.01); *H01M 2/1653* (2013.01); *H01M 4/133* (2013.01); *H01M 4/661* (2013.01); *H01M 10/052* (2013.01); *H01M 10/0568* (2013.01); *H01M 10/0569* (2013.01); *H01M 10/0587* (2013.01)

(56) References Cited

U.S. PATENT DOCUMENTS

| | | | |
|---|---|---|---|
| 3,311,830 A | 3/1967 | Skirvin | |
| 3,576,732 A | 4/1971 | Weidinger et al. | |
| 3,713,086 A | 1/1973 | Trott | |
| 4,042,845 A * | 8/1977 | Hackett | G10K 11/28 310/322 |
| 4,241,535 A | 12/1980 | Tsukuda | |
| 4,259,415 A | 3/1981 | Tamura et al. | |
| 4,353,004 A | 10/1982 | Kleinschmidt | |
| 4,762,427 A | 8/1988 | Hori et al. | |
| 4,986,276 A | 1/1991 | Wright | |
| 5,177,891 A | 1/1993 | Holt | |
| 5,211,129 A | 5/1993 | Taylor et al. | |
| 5,344,357 A | 9/1994 | Lyczek | |
| 5,517,465 A | 5/1996 | Nestler et al. | |
| 5,675,555 A | 10/1997 | Evans et al. | |
| 5,697,384 A | 12/1997 | Miyawaki et al. | |
| 5,974,304 A | 10/1999 | Chen | |
| 5,995,451 A | 11/1999 | Evans et al. | |
| 6,201,766 B1 | 3/2001 | Carlson et al. | |
| 6,662,742 B2 | 12/2003 | Shelton et al. | |
| 6,712,772 B2 | 3/2004 | Cohen et al. | |
| 7,016,260 B2 | 3/2006 | Baray | |
| 7,289,931 B2 | 10/2007 | Ebert | |
| 7,457,720 B2 | 11/2008 | Ebert | |
| 8,032,429 B2 * | 10/2011 | Shafer | G06Q 10/087 340/10.1 |
| 8,033,890 B2 | 10/2011 | Warner et al. | |
| 8,564,985 B2 | 10/2013 | van Straaten | |
| 9,266,591 B2 | 2/2016 | Lu | |
| 2003/0117893 A1 | 6/2003 | Baray | |
| 2003/0128847 A1 | 7/2003 | Smith | |
| 2006/0218374 A1 * | 9/2006 | Ebert | G01S 13/87 712/5 |
| 2007/0088194 A1 | 4/2007 | Tahar et al. | |
| 2007/0103314 A1 | 5/2007 | Geissler | |
| 2007/0288160 A1 | 12/2007 | Ebert | |
| 2009/0073802 A1 | 3/2009 | Nizzola et al. | |
| 2009/0079368 A1 | 3/2009 | Poppen et al. | |
| 2009/0188320 A1 | 7/2009 | Greenough et al. | |
| 2011/0105829 A1 | 5/2011 | Ball | |
| 2011/0163857 A1 | 7/2011 | August et al. | |
| 2011/0181399 A1 | 7/2011 | Pollack et al. | |
| 2011/0254529 A1 | 10/2011 | van Straaten | |
| 2012/0134239 A1 * | 5/2012 | Struthers | H04B 1/034 367/137 |
| 2012/0277550 A1 | 11/2012 | Rosenkranz et al. | |
| 2013/0012865 A1 | 1/2013 | Sallberg et al. | |
| 2013/0181839 A1 | 7/2013 | Cao | |
| 2013/0324059 A1 | 12/2013 | Lee et al. | |
| 2014/0211594 A1 | 7/2014 | Allen et al. | |
| 2015/0241566 A1 | 8/2015 | Chakraborty et al. | |
| 2015/0289479 A1 | 10/2015 | Allen et al. | |
| 2016/0211924 A1 * | 7/2016 | Deng | H04B 11/00 |
| 2016/0245894 A1 | 8/2016 | Deng et al. | |
| 2017/0089878 A1 | 3/2017 | Deng et al. | |
| 2017/0164581 A1 | 6/2017 | Deng et al. | |
| 2017/0170850 A1 | 6/2017 | Deng et al. | |
| 2018/0055007 A1 | 3/2018 | Deng et al. | |

FOREIGN PATENT DOCUMENTS

| | | | |
|---|---|---|---|
| CN | 102568463 | 7/2012 | |
| CN | 102598716 | 7/2012 | |
| CN | 202414143 | 9/2012 | |
| CN | 102754249 | 10/2012 | |
| CN | 2014800479315 | 7/2017 | |
| EP | 2037396 A1 | 3/2009 | |
| EP | 1705500 B1 | 6/2010 | |
| GB | 1195633 A * | 6/1970 | ............ H01M 2/40 |
| GB | 2188028 A | 9/1987 | |
| WO | WO 2011068825 A1 * | 6/2011 | ............ H01M 4/133 |

OTHER PUBLICATIONS

Johnson, Mark P., and Peter L. Tyack. "A digital acoustic recording tag for measuring the response of wild marine mammals to sound." IEEE journal of oceanic engineering 28.1 (2003): 3-12.*
Brown, Lewis F. "Design considerations for piezoelectric polymer ultrasound transducers." IEEE transactions on ultrasonics, ferroelectrics, and frequency control 47.6 (2000): 1377-1396.*
Brown, L. F. "The effects of material selection for backing and wear protection/quarter-wave matching of piezoelectric polymer ultrasound transducers." Ultrasonics Symposium, 2000 IEEE. vol. 2. IEEE, 2000.*
U.S. Army Corps of Engineers, Portland District, JSATS Tag downsize project progress report, Apr. 26, 2010, Pacific Northwest National Laboratory.*
El Rifai, Osamah M., and Kamal Youcef-Toumi. "Modeling of Piezoelectric Tube Actuators." (2004).*
Carlson, Thomas J., and Mitchell J. Myjak. "Juvenile Salmon Acoustic Telemetry System Transmitter Downsize Assessment." Pacific Northwest National Laboratory: Richland, WA, USA (2010).*
Deng, Z. D., et al. "An injectable acoustic transmitter for juvenile salmon." Scientific reports 5 (2015).*
Jonathan Dillon, AN1333 Use and Calibration of the Internal Temperature Indicator, Microchip Technology Inc., 2010.*
PNNL: JSATS—Acoustic Transmitters. Mar. 2010. Pacific Northwest National Laboratory.*
Butler, A. L., et al. "A trimodal directional modem transducer." Oceans 2003. Proceedings. vol. 3. IEEE, 2003.*
2007. GBrooker. Chapter 2. Signal Processing and Modulation. [URL: http://www.acfr.usyd.edu.au/pdfs/training/sensorSystems/02%20Signal%20Processing%20and%20Modulation.pdf]. (Year: 2007).*
Brown, R. S., et al., An Evaluation of the Maximum Tag Burden for Implantation of Acoustic Transmitters in Juvenile Chinook Salmon, North American Journal of Fisheries Management, 30, 2010, 499-505.
Deng, Z., et al., Design and Instrumentation of a Measurement and Calibration System for an Acoustic Telemetry System, Sensors, 10, 2010, 3090-3099.
Deng, Z. D., et al., A Cabled Acoustic Telemetry System for Detecting and Tracking Juvenile Salmon: Part 2. Three-Dimensional Tracking and Passage Outcomes, Sensors, 11, 2011, 5661-5676.

(56) References Cited

OTHER PUBLICATIONS

Lam, P., et al., Physical characteristics and rate performance of (CFx)n (0.33<x<9,66) in lithium batteries, Journal of Power Sources, 153, 2006, 354-359.
McMichael, G. A., et al., The Juvenile Salmon Acoustic Telemetry System: A New Tool, Fisheries, 35, 2010, 9-22.
Meduri, P., et al., Hybrid CVx-Ag2V4O11 as a high-energy, power density cathode for application in an underwater acoustic microtransmitter, Electrochemistry Communications, 13, 2011, 1344-1348.
Ritchie, A. G., et al., Further development of lithium/polycarbon monofluoride envelope cells, Journal of Power Sources, 96, 2001, 180-183.
Weiland, M. A., et al., A Cabled Acoustic Telemetry System for Detecting and Tracking Juvenile Salmon: Part 1. Engineering Design and Instrumentation, Sensors, 11, 2011, 5645-5660.
Zhang, S. S., et al., Enhancement of discharge performance of Li/CFx cell by thermal treatment of CFx cathode material, Journal of Power Sources, 188, 2009, 601-605.
Yazami, R., et al., Fluorinated carbon nanofibres for high energy and high power densities primary lithium batteries, Electrochemistry Communications, 9, 2007, 1850-1855.
Li, H., et al., Piezoelectric Materials Used in Underwater Acoustic Transducers, Sensor Letters, 10 (3/4), 2012a, 679-697.
Li, H., et al., Design Parameters of a Miniaturized Piezoelectric Underwater Acoustic Transmitter, Sensors, 12, 2012, 9098-9109.
Rub, A. M. W, et al., Comparative Performance of Acoustic-Tagged and Passive Integrated Transponder-Tagged Juvenile Salmonids in the Columbia and Snake Rivers, 2007, U.S. Army Corps of Engineers, Portland District, Portland, Oregon.
Invitation to Pay Additional Fees/Communication Relating to the Results of the Partial International Search for International Application No. PCT/US2014/053578, International Filing Date Aug. 29, 2012, dated Dec. 5, 2014.
McMichael, G. et al., The Juvenile Salmon Acoustic Telemetry System: A New Tool, Fisheries, 35, 1, 2010, 9-22.
Eppard, B., Juvenile Salmon Acoustic Telemetry System JSATS, Dec. 14, 2011, URL:https://www.nwcouncil.org/media/23478/jsats.pdf, 1-13.
Weiland, M. A., et al., A Cabled Acoustic Telemetry System for Detecting and Tracking Juvenile Salmon: Part 1. Engineering Design and Instrumentation, Sensors, 11, 12, 2011, 5645-5660.
International Search Report/Written Opinion for International Application No. PCT/US2014/053578, International Filing Date Aug. 29, 2012, dated Mar. 5, 2015.
WO PCT/US2014/053578 IPRP, dated Mar. 1, 2016, Battelle Memorial Institute.
Aktakka et al., "Energy Scavenging from Insect Flight", Journal of Mimomechanics and Microengineering vol. 21, 095016, 2011, United Kingdom 10 pages. Aktakka et al., "Energy Scavenging from Insect Flight", Journal of Mimomechanics and Microengineering vol. 21, 095016, 2011, United Kingdom 10 pages.
Cha et al., "Energy Harvesting from a Piezoelectric Biomimetic Fish Tail", Renewable Energy vol. 86, 2016, Netherlands, pp. 449-458.
Cha et al., "Energy Harvesting from the Tail Beating of a Carangiform Swimmer using Ionic Polymer-Metal Compositions", Bioinspiration and Biomimetics vol. 8, 2013, United Kingdom, 15 pages.
Cook et al., "A Comparison of Implantation Methods for Large PIT Tags or Injectable Acoustic Transmitters in Juvenile Chinook Salmon", Fisheries Research vol. 154, 2014, Netherlands, pp. 213-223.
Dagdeviren et al., "Conformal Piezoelectric Energy Harvesting and Storage from Motions of the Heart, Lung, and Diaphragm", Proceedings of the National Academy of Sciences of the United States of America vol. 111, 2014, United States, pp. 1927-1932.
Deng et al., "An Injectable Acoustic Transmitter for Juvenile Salmon", Scientific Reports, Jan. 29, 2015, United Kingdom, 6 pages.

Deng et al., U.S. Appl. No. 15/087,936, filed Mar. 31, 2016, titled "Signal Transmitter and Methods for Transmitting Signals from Animals", 59 pages.
Deng et al., U.S. Appl. No. 15/088,032, filed Mar. 31, 2016, titled "Transmitters for Animals and Methods for Transmitting from Animals", 57 pages.
Deng et al., U.S. Appl. No. 62/267,738, filed Dec. 15, 2015, titled "Transmitters for Animals and Methods for Transmitting from Animals", 42 pages.
Deng et al., U.S. Appl. No. 62/267,797, filed Dec. 15, 2015, titled "Signal Transmitter and Methods for Transmitting Signals from Animals", 34 pages.
Erturk et al., "Underwater Thrust and Power Generation Using Flexible Piezoelectric Composites: An Experimental Investigation Toward Self-Powered Swimmer-Sensor Platforms", Smart Materials and Structures vol. 20, 125013, 2011, United Kingdom, 11 pages.
Hwang et al., "Self-Powered Cardiac Pacemaker Enabled by Flexible Single Crystalline PMN-PT Piezoelectric Energy Harvester", Advanced Materials vol. 26, 2014, Germany, pp. 4880-4887.
Hwang et al., "Self-Powered Deep Brain Stimulation via a Flexible PIMNT Energy Harvester", Energy and Environmental Science vol. 8, 2015, United Kingdom, pp. 2677-2684.
Li et al., "Energy Harvesting from Low Frequency Applications using Piezoelectric Materials", Applied Physics Reviews 1, 041301, 2014, United States, 20 pages.
Li et al., "Piezoelectric Transducer Design for a Miniaturized Injectable Acoustic Transmitter", Smart Materials and Structures vol. 24, 115010, 2015, United Kingdom, 9 pages.
S.M. Corporation, "Macro Fiber Composite—MFC" Smart Material Brochure, United States, 8 pages.
Shafer, "Energy Harvesting and Wildlife Monitoring", available online at http://www.ofwim.org/wp-content/uploads/2014/11/Shafer_keynote.pdf, 2014, 36 pages.
Cada, "The Development of Advanced Hydroelectric Turbines to Improve Fish Passage Survival", Fisheries vol. 26, No. 9, Sep. 2001, United States, pp. 14-23.
Carlson et al., "Sensor Fish Characterization of Spillway Conditions at Ice Harbor Dam in 2004, 2005 and 2006", PNWD-3839 Final Report, Mar. 2008, United States, 95 pages.
Carlson et al., "The Sensor Fish—Making Dams More Salmon-Friendly", Sensors Online, Jul. 2004, United States, 7 pages.
Coutant, "Fish Behavior in Relation to Passage Through Hydropower Turbines: A Review", Transactions of the American Fisheries Society vol. 129, 2000, United States, pp. 351-380.
Deng et al., "Design and Implementation of a New Autonomous Sensor Fish to Support Advanced Hydropower Development", Review of Scientific Instruments vol. 85, 2014, United States, 6 pages.
Deng et al., "Evaluation of Fish-Injury Mechanisms During Exposure to Turbulent Shear Flow", Canadian Journal of Fisheries and Aquatic Sciences vol. 62, 2005, Canada, pp. 1513-1522.
Deng et al., "Six-Degree-of-Freedom Sensor Fish Design and Instrumentation", Sensors vol. 7, 2007, United States, pp. 3399-3415.
Deng et al., "Use of an Autonomous Sensor to Evaluate the Biological Performance of the Advanced Turbine at Wanapum Dam", Journal of Renewable and Sustainable Energy vol. 2, 2010, United States, 11 pages.
Deng et al., U.S. Appl. No. 14/871,761, filed Sep. 30, 2015, titled "Autonomous Sensor Fish to Support Advanced Hydropower Development", 41 pages.
Dillon, "Use and Calibration of the Internal Temperature Indicator", Microchip Technology Inc. AN1333, 2010, United States, 12 pages.
Odeh, "A Summary of Environmentally Friendly Turbine Design Concepts", DOE/ID/13741 Paper, Jul. 1999, United States, 47 pages.
Richmond et al., "Response Relationships Between Juvenile Salmon and an Autonomous Sensor in Turbulent Flow", Fisheries Research vol. 97, 2009, Netherlands, pp. 134-139.
WO PCT/US2016/054981 Search Rept., dated Nov. 18, 2016, Battelle Memorial Inc.

(56) References Cited

OTHER PUBLICATIONS

WO PCT/US2016/054981 Writ. Opin., dated Nov. 18, 2016, Battelle Memorial Inc.
WO PCT/US2016/055045 Search Rept., dated Feb. 7, 2017, Battelle Memorial Inc.
WO PCT/US2016/055045 Writ. Opin., dated Feb. 7, 2017, Battelle Memorial Inc.
WO 2011/079338 Full Ref., dated Jul. 7, 2011, SmaXtee Animal Care Sales Gr.
WO 2015/031853 Full Ref., dated Mar. 5, 2015, Battelle Memorial Inc.
Lewandowski et al., "In Vivo Demonstration of a Self-Sustaining, Implantable, Stimulated-Muscle-Powered Piezoelectric Generator Prototype", Annals of Biomedical Engineering vol. 37, No. 11, Nov. 2009, Netherlands, pp. 2390-2401.
Platt et al., "The Use of Piezoelectric Ceramics for Electric Power Generation Within Orthopedic Implants", IEEE/ASME Transactions on Mechatronics vol. 10, No. 4, Aug. 2005, United States, pp. 455-461.
WO PCT/US2017/038082 Inv Pay Fees, dated Sep. 15, 2017, Battelle Memorial Institute.
WO PCT/US2017/038082 Search Rept., dated Nov. 20, 2017, Battelle Memorial Institute.
WO PCT/US2017/038082 Writ. Opin., dated Nov. 20, 2017, Battelle Memorial Institute.
WO 95/03691 Full Reference, dated Feb. 9, 1995, Torronen.
Adams et al., "Effects of Surgically and Gastrically Implanted Radio Transmitters on Swimming Performance and Predator Avoidance of Juvenile Chinook Salmon (Oncorhynchus tshawytscha)", Canadian Journal of Fishieries and Aquatic Sciences 55, 1998, Canada, pp. 781-787.
Angela et al., "Effects of Acoustic Transmitters on Swimming Performance and Predator Avoidance of Juvenile Chinook Salmon", North American Journal of Fisheries Management 24, 2004, United States, pp. 162-170.
Atlantic States Marine Fisheries Commission, "American Eel Benchmark Stock Assessment Report No. 12-01", May 2012, United States, 340 pages.
Bams, "Differences in Performance of Naturally and Artifically Propagated Sockeye Salmon Migrant Fry, as Measured With Swimming and Predation Tests", Journal of the Fisheries Board of Canada 24(5), 1967, Canada, pp. 1117-1153.
Barbin et al., "Behaviour and Swimming Performance of Elvers of the American Eel, Anguilla Rostrata, in an Experiment Flume", Journal of Fish Biology 45, 1994, United Kingdom, pp. 111-121.
Boubee et al., "Downstream Passage of Silver Eels at a Small Hydroelectric Facility", Fisheries Management and Ecology vol. 13, 2006, United Kingdom, pp. 165-176.
Brett, "The Respiratory Metabolism and Swimming Performance of Young Sockeye Salmon", Journal of the Fisheries Board of Canada 21(5), 1964, Canada, pp. 1183-1226.
Brown et al., "Evidence to Challenge the "2% Rule" for Biotelemetry", North American Journal of Fisheries Management 19, 1999, United States, pp. 867-871.
Brown et al., "Survival of Seaward-Migrating PIT and Acoustic-Tagged Juvenile Chinook Salmon in the Snake and Columbia Rivers: An Evaluation of Length-Specific Tagging Effects", Animal Biotelemetry 1:8, 2013, United States, 13 pages.
Collins et al., "Intracoelomic Acoustic Tagging of Juvenile Sockeye Salmon: Swimming Performance, Survival, and Postsurgical Wound Healing in Freshwater and during a Transition to Seawater", Transactions of the American Fisheries Society 142, 2013, United States, pp. 515-523.
Cote et al., "Swimming Performance and Growth Rates of Juvenile Atlantic Cod Intraperitoneally Implanted with Dummy Acoustic Transmitters", North American Journal of Fisheries Management vol. 19, 1999, United States, pp. 1137-1141.
Counlhan et al., "Influence of Externally Attached Transmitters on the Swimming Performance of Juvenile White Sturgeon", Transactions of the American Fisheries Society 128, 1999, United States, pp. 965-970.
Deng et al., U.S. Appl. No. 15/393,617, filed Dec. 29, 2016, titled "Systems and Methods for Monitoring Organisms Within an Aquatic Environment", 49 pages.
Fisheries and Oceans Canada (DFO), "Recovery Potential Assessment of American Eel (Anguilla rostrata) in Eastern Canada", Canadian Science Advisory Secretariat Science Advisory Report 2013/078, 2013, Canada, 65 pages.
Harnish et al., "A Review of Polymer-Based Water Conditioners for Reduction of Handling-Related Injury", Reviews in Fish Biology and Fisheries 21, 2011, Netherlands, pp. 43-49.
Janak et al., "The Effects of Neutrally Buoyant, Externally Attached Transmitters on Swimming Performance and Predator Avoidance of Juvenile Chinook Salmon", Transactions of the American Fisheries Society 141, 2012, United States, pp. 1424-1432.
MacGregor et al., "Recovery Strategy for the American Eel (Anguilla rostrata) in Ontario", Ontario Recovery Strategy Series, Prepared for Ontario Ministry of Natural Resources, Peterborough, Ontario, 2013, Canada, 131 pages.
McGrath et al., "Studies of Upstream Migrant American Eels at the Moses-Saunders Power Dam on the St. Lawrence River near Massena, New York", American Fisheries Society Symposium 33, 2003, United States, pp. 153-166.
Mesa et al., "Survival and Growth of Juvenile Pacific Lampreys Tagged with Passive Integrated Transponders (PIT) in Freshwater and Seawater", Transactions of the American Fisheries Society 141, 2012, United States, pp. 1260-1268.
Mueller et al., "Tagging Juvenile Pacific Lamprey with Passive Integrated Transponders: Methodology, Short-Term Mortality, and Influence on Swimming Performance", North American Journal of Fisheries Management vol. 26, 2006, United States, pp. 361-366.
Normandeau, "Survey for Upstream American Eel Passage at Holyoke Dam, Connecticut River, Massachusetts, 2006", Prepared for Holyoke Gas and Electric by Normandeau Associates, Inc., Apr. 26, 2007, United States, 68 pages.
Økland et al., "Recommendations on Size and Position of Surgically and Gastrically Implanted Electronic Tags in European Silver Eel", Animal Biotelemetry 1:6, 2013, United Kingdom, pp. 1-5.
Panther et al., "Influence of Incision Location on Transmitter Loss, Healing, Survival, Growth, and Suture Retention of Juvenile Chinook Salmon", Transactions of the American Fisheries Society 140, 2011, United States, pp. 1492-1503.
Summerfelt et al., "Anesthesia, Surgery, and Related Techniques", in Schreck, C.B., Moyle, P.B., (Eds.), Methods for Fish Biology, American Fisheries Society, 1990, United States, pp. 213-272.
Verdon et al., "Recruitment of American Eels in the Richelleu River and Lake Champlain: Provision of Upstream Passage as a Regional-Scale Solution to a Large-Scale Problem", American Fisheries Society Symposium 33, 2003, United States, pp. 125-138.
Walker et al., "Effects of a Novel Acoustic Transmitter on Swimming Performance and Predator Avoidance of Juvenile Chinook Salmon: Determination of a Size Threshold", Fisheries Research 176, 2016, Netherlands, pp. 48-54.
Ward et al., "A Laboratory Evaluation of Tagging-Related Mortality and Tag Loss in Juvenile Humpback Chub", North American Journal of Fisheries Management 35, 2015, United States, pp. 135-140.
Wuenschel et al., "Swimming Ability of Eels (Anguilla rostrata, Conger oceanicus) at Estuarine Ingress: Contrasting Patterns of Cross-Shelf Transport?", Marine Biology 154, 2008, Germany, pp. 775-786.
Zale et al., "Effects of Surgically Implanted Transmitter Weights on Growth and Swimming Stamina of Small Adult Westslope Cutthroat Trout", Transactions of the American Fisheries Society vol. 134(3), 2005, United States, pp. 653-660.
WO PCT/US2015/062200 IPRP, dated Jun. 29, 2017, Battelle Memorial Institute.
WO PCT/US2015/062200 Search Rept., dated Feb. 24, 2016, Battelle Memorial Institute.

(56) References Cited

OTHER PUBLICATIONS

WO PCT/US2015/062200 Writ. Opin., dated Feb. 24, 2016, Battelle Memorial Institute.
Biopack Systems, Inc. Hardware Guide, 2013, 152 pages.
Dinwoodie, "Dual Output Boost Converter", Texas Instruments Application Report SLUA288, available online at http://www.ti.com/lit/an/slua288/slua288.pdf, Apr. 2003, 9 pages.
Gallego-Juarez et al., "Experimental Study of Nonlinearity in Free Progressive Acoustic Waves in Air at 20 kHz", Journal de Physique, Colloques, 40 (CB), 1979, France, pp. 336-340.
Li et al., "Piezoelectric Materials used in Underwater Acoustic Transmitters", Sensor Letters vol. 10, 2012, United States, 85 pages.

* cited by examiner

US 10,033,469 B2

INJECTABLE ACOUSTIC TRANSMISSION DEVICES AND PROCESS FOR MAKING AND USING SAME

STATEMENT REGARDING RIGHTS TO INVENTION MADE UNDER FEDERALLY-SPONSORED RESEARCH AND DEVELOPMENT

This invention was made with Government support under Contract DE-AC05-76RL01830 awarded by the U.S. Department of Energy. The Government has certain rights in the invention.

FIELD OF THE INVENTION

The present invention relates generally to acoustic tracking devices and systems. More particularly, the present invention relates to injectable acoustic transmission devices for detection and remote tracking of host animals in up to three dimensions in real-time or as a function of time.

BACKGROUND OF THE INVENTION

Acoustic telemetry involves acoustic devices (acoustic tags) commonly used to monitor the behavior of, e.g., marine and freshwater fish. Acoustic tags transmit a sound signal or acoustic "ping" that sends identification information and location information about a tagged animal to a receiver. The receiver converts sound signals into digital data. Post processing software processes the digital data and provides positions of the tag in up to three dimensions (3D) when at least four receivers detect the same sound signal. By determining the sound's time of arrival at the hydrophone receiver, the position of the tagged animal can be determined, allowing tracking of the host animal. Then, by tying the acoustic signature received from the transmitter to the programmed signal code, a specific animal may be identified. An array of receivers allows the movement of particular animals to be tracked.

Acoustic telemetry has been identified as a technology for observation of behavior and assessment of survival for juvenile Chinook salmon passing through the Federal Columbia River Power System. Considerable effort has been expended to understand the biological effects of implantation of acoustic tags in yearling and sub-yearling Chinook salmon. Much additional effort has gone into development of autonomous and cabled receiving systems that can be deployed at dams and elsewhere in rivers. Receiving systems detect signals emitted by the acoustic tags, process the resulting detection data to track the fish, and provide data necessary to estimate survival through dams and other routes of passage. Together, the acoustic tags and receiving systems in the Columbia River system make up the Juvenile Salmon Acoustic Telemetry System (JSATS). Although acoustic tags presently used for JSATS meet current tag burden guidelines for most yearling Chinook salmon, the tags are too large for smaller juvenile Chinook salmon, particularly those found in the lower Columbia River and estuary that enter the river downstream of Bonneville Dam. Bioeffects studies also indicate that juvenile Chinook salmon less than 95 mm in length (approximately 9 g weight) implanted with current acoustic tags have reduced survival and growth rates. Accordingly, new tag designs are needed that reduce the overall size, weight, and volume, enhance the range and lifetime, reduce adverse effects associated with implantation, and broaden the range of potential applications. The present invention addresses these needs.

SUMMARY OF THE INVENTION

The present invention includes new injectable acoustic (sound-emitting) transmission devices (injectable acoustic tags) and a process of making. Injectable acoustic tags of the present invention provide identification and remote tracking of host animals including fish, e.g., in marine or freshwater environments in up to three dimensions (3D) (i.e., X-Y-Z coordinates) in real-time or as a function of time. Injectable acoustic tags may be used in applications such as, e.g., fish survival studies; monitoring fish migration/passage/trajectories; tracking fish behavior in two dimensions (2D) or three dimensions (3D); measuring bypass effectiveness at dams and other passages; observing predator/prey dynamics; helping public utility agencies, private firms, and state and federal agencies meet fisheries regulations; and other applications. Compared to surgically implanted (i.e., non-injectable) tags, injectable tags of the present invention reduce bio-handling and enhance survivability of marine animals being tracked. Injectable acoustic tags of the present invention transmit location, identification, and sensor information in an encoded acoustic signal that propagates from the tag to an external receiver. The encoded acoustic signal takes the form of one or more tag codes, each tag code typically, but not exclusively, being transmitted at regular intervals. Both the tagged animal and external receiver are typically located underwater, but are not limited.

The injectable acoustic tags incorporate new advanced features compared to conventional acoustic tags. One advanced feature of the injectable acoustic tags is the ability to transmit more than one tag code. This feature increases the number of unique tag identifications (IDs) that may be transmitted in the acoustic signal while maintaining full backward compatibility with existing receiver equipment.

In some applications, the injectable acoustic tag may alternate transmission between two tag codes. In some applications, tag codes may be identical.

Another advanced feature of the injectable acoustic tags is that each tag code is fully configurable including, e.g., the bit length of the code (i.e., code length) and the number of acoustic pulses per bit for maximum application flexibility. For example, in some applications, a shorter tag code may be used for acoustic transmissions close to the water surface to decrease undesirable multipath effects. In other applications, a longer tag code may be used to permit a greater number of unique tag identifications.

Yet another advanced feature of the injectable acoustic tags is the ability to embed temperature or other sensor data into at least one of the tag codes and to append the correct error checking bits to the tag code based on the encoded sensor data values. For example, in some applications, temperature data collected from a temperature sensor in the injectable acoustic tag may be transmitted as part of the tag code.

Sensors in the injectable acoustic tag may include: accelerometers; rotational velocity sensors; magnetometers; pressure sensors; temperature sensors; and combinations of these various sensors.

Yet another advanced feature of the injectable acoustic tags is the ability to configure both the acoustic source level and acoustic transmission frequency. This feature allows the battery life to be optimized for the application. Each injectable tag maintains the acoustic source level at approximately the same level as the battery discharges, which helps ensure consistency between data collected at different times.

Yet another advanced feature of the injectable acoustic tags is the ability to wait for a configurable amount of time before starting normal acoustic transmissions. This waiting period can be up to 30 days or more. This feature is useful for tagging marine animals prior to their migration time. The injectable tags can also be placed in a state that consumes minimal power so that the tags can be stored for a year or more before use.

The injectable acoustic tags have a reduced size, weight, and volume that exceeds source level outputs and lifetimes compared with conventional acoustic tags. The reduced size, weight, and volume of the new tags permit study of animal species with sizes that are too small for current JSATS tags, which broadens the range of applications. The injectable acoustic tags are also less expensive to produce and use. They also provide data and information suitable for development of animal-friendly hydro systems on an international scale.

Components of the injectable acoustic tags may be encapsulated within a capsular containment structure (capsule) made of a thermosetting polymer (e.g., an epoxide thermosetting polymer) of various defined shapes that allows the tags to be injectable. Internal volumes are less than about 115 mm$^3$. In some applications, injectable acoustic tags may include a length of about 15 mm and a diameter of about 3.4 mm.

In some applications, injectable acoustic tags may have a dry weight of about 220 mg or less. In some applications, injectable acoustic tags may contain a rigid printed circuit board with various electronics components attached.

Injectable acoustic tags of the present invention may be powered by a single custom power source or battery that delivers a source voltage output of from about 1.8 V to about 3.0 V. The battery may provide a lifetime of greater than 35 days of full-time activity at a transmission pulse rate of 5 seconds, and may provide a lifetime of at least 23 days of full-time activity at a transmission rate of 3 seconds. The power source may have a mass of about 75 mg or less. The power source may provide an energy density of at least about 230 Wh/kg.

The power source (battery) may include a plurality of laminates configured to supply an output voltage of at least about 2.5 volts. Each laminate may include an anode, and a cathode positioned between polymer separators that electrically isolates the cathode from the anode in the laminate. The separator may include a micro-porous polypropylene. The cathode may be include, or be constructed of, e.g., carbon fluoride and a conducting carbon within a binder affixed at a selected thickness to a current collector. The binder may include, e.g., polytetrafluoroethylene (PTFE). In some applications, the cathode may include 85 wt % carbon fluoride, 10 wt % carbon, and 5 wt % polytetrafluoroethylene (PTFE) binder. The current collector may include a metal mesh of aluminum or an aluminum-containing alloy. The anode may include lithium metal of a selected thickness and a selected weight. The cathode/anode laminates may be enclosed within a container constructed of a high mechanical strength, chemically resistant polymer of a selected thickness. The power source may be filled with an electrolyte. The electrolyte may include a selected concentration of lithium hexafluorophosphate (LiPF$_6$) disbursed in a selected volume ratio of ethylene carbonate (EC) and dimethyl carbonate (DMC) that minimizes voltage drops within the power source during operation.

Injectable acoustic tags may include one or more piezoelectric transducers. The number of transducers is not limited. Each piezoelectric transducer may vibrate at a selected resonant frequency, which transmits an acoustic signal containing encoded data from the piezoelectric transducer to a receiver.

Injectable acoustic tags may include a controller that couples to the power source and controls various circuits and functions within the acoustic tag. In some applications, the controller may be a microcontroller that contains a processor core, memory, internal oscillators, timers, and programmable input and output peripherals, which executes embedded firmware (source code) that defines its operation.

Injectable acoustic tags may include a resonator, crystal, or other type of oscillator component to provide an external clock signal to the microcontroller. The microcontroller may use an external clock signal to help control the circuits on the tag that generate the acoustic signal. The microcontroller may also use an external clock signal to help calibrate its internal oscillators and timers. In some applications, the tag uses a ceramic resonator with a resonant frequency of about 10 MHz with about 0.5% precision.

Injectable acoustic tags may include an infrared (IR) sensor that couples to the controller and provides an optical link to a host computer located external to the acoustic tag. The infrared sensor may receive programming and configuration information from the host computer that configures the controller for operation of the tag (e.g., start transmission, set the transmission frequency to 3 seconds, and additional operations).

Injectable acoustic tags may include a boost converter circuit that couples to the controller and the power source. The boost converter circuit may enhance the voltages from the power source (battery) and provides those voltages to the drive circuit that drives the piezoelectric transducer. The boost converter circuit may enhance the voltage from the power source that is provided to the at least one piezoelectric transducer by up to about 6 volts.

Injectable acoustic tags may include a drive circuit that couples to the controller and to either the boost converter circuit or the power source. The drive circuit may deliver a drive voltage to the piezoelectric transducers to generate vibration in one or more vibrational modes. This process in turn generates the acoustic signal that is transmitted from the injectable acoustic tags.

The acoustic signal transmitted from the injectable acoustic tags may contain binary (or derivative) data encoded with phase-shift keying (PSK). The binary data may contain header bits (e.g., a Barker code), a tag identification (ID) code, data collected from one or more sensors (e.g., temperature from a temperature sensor), error checking bits (e.g., a cyclic redundancy check), or combinations of any or all of the above. The binary data within a single acoustic signal comprises one tag code. The injectable acoustic tag may store one or more distinct tag codes.

The present invention also includes a method for transmission of identification and location information about a host animal in real-time or as a function of time. The method may include injecting an injectable acoustic transmission device of a selected size and shape at a selected location in the body of the host animal. Location and identification data about the host animal may be transmitted from the injectable acoustic tag located within the body of the host animal to a receiver located external to the host animal as an acoustic signal encoded with one or more tag codes of a selected code length.

The acoustic signal when received from the injectable acoustic transmission device may be decoded to identify and track the host animal in up to three dimensions in real-time or as a function of time. The method may include programming the injectable acoustic tag for operation via an optical link device in the tag. The programming may include configuring the injectable acoustic tag to automatically adjust the output voltage of the power source to retain a full power level as the power source discharges as a function of time.

Injectable acoustic tags may be injected into the body of the host animal, e.g., along the linea alba.

The receiver may be an acoustic hydrophone. The acoustic signal from the piezoelectric transducer may be transmitted at a source level that is programmable, which results in a selectable detection range. The piezoelectric transducer may be of a spherical shell geometry or tube geometry. The outer wall and inner wall of the piezoelectric transducer may be coated with an electrode that permits the piezoelectric transducer to be coupled to the circuit board.

In some applications, an acoustic reflector may be coupled to the piezoelectric transducer, e.g., behind the piezoelectric transducer. The reflection of acoustic waves enhances the acoustic signal transmitted from the piezoelectric transducer. The acoustic reflector may be placed in direct contact with each individual piezoelectric transducer. The acoustic reflector may reflect acoustic waves emitted from the back of the piezoelectric transducer, which would otherwise propagate towards, or interfere with, electronic components, the battery, or other components of the acoustic tag, to achieve desired beam patterns.

In some applications, the acoustic reflector may be fashioned of a porous material that is filled with a gas such as air.

In some applications, the piezoelectric transducer may be an off-centered piezoelectric ceramic tube transducer or a spherical shell transducer in which the outer circumference and inner circumference of the transducers are not concentric. The inner circumference may be offset towards the desired direction of transmission to maximize the acoustic energy emitted in that direction.

In some applications, the piezoelectric transducer may be polarized (activated) along the wall thickness direction to produce a selected vibration at a selected resonance frequency. For example, when actuated by an AC voltage, the piezoelectric transducer may vibrate in the radial direction that resembles a breathing motion, i.e., the so-called "breathing" vibrational mode. Yet, vibrational modes are not limited. Length mode and thickness mode may also be used, either alone or in combination with "breathing mode".

In some applications, the vibrational mode may be selected to be about 10 kHz to 50 kHz higher than the frequency of the drive signal that drives the transducer. Higher resonance frequencies can compensate for downshifts in the transducer frequency caused by the coating surrounding the transducers.

Injectable acoustic tags may be programmed to transmit one or more encoded identification (ID) codes. Each tag code may include a code length of up to 64 binary bits. The controller may coordinate the timing and transmission of each of the tag IDs, alternating transmission of, e.g., a first tag ID and a second tag ID. In some applications, only a single tag code ID may be desired. Format of the tag codes is selectable. In some applications, one of the tag IDs may be configured to transmit data from various sensors incorporated into the injectable tag.

The coding may include configuring the number of cycles required per bit of data transmitted from the injectable acoustic transmission device. The coding may include programming the injectable acoustic transmission device to transmit the one or more identification codes within the acoustic signal transmitted from the injectable acoustic transmission device.

The foregoing summary is neither intended to define the invention, which is measured by the claims, nor to be limiting as to the scope of the invention in any way.

DETAILED DESCRIPTION

New injectable acoustic transmission devices (injectable acoustic tags) and a process of making are detailed that provide identification and remote tracking of marine or freshwater animals, including fish, in water environments in up to three dimensions (3D) (i.e., X-Y-Z coordinates) in real-time or as a function of time. Features of the injectable acoustic tags can be tailored for various unique applications and projects. Studies may be conducted in lakes, rivers, tributaries, estuaries, and at sea. The following description includes a best mode of the present invention. While the present invention is susceptible of various modifications and alternative constructions, it should be understood that there is no intention to limit the present invention to specific forms disclosed herein, but, on the contrary, the present invention is to cover all modifications, alternative constructions, and equivalents falling within the scope of the present invention as defined in the claims. Therefore the present description should be seen as illustrative and not limiting. Additional features of the present invention are detailed by Deng et al. in a document entitled "JSATS Injectable Acoustic Transmitter Reference Design Documentation" prepared by the Pacific Northwest National Laboratory (Document No.: PNNL-22372) for the U.S. Army Corps of Engineers, Portland District, March 2013, which reference is incorporated herein in its entirety.

Figure 1A:
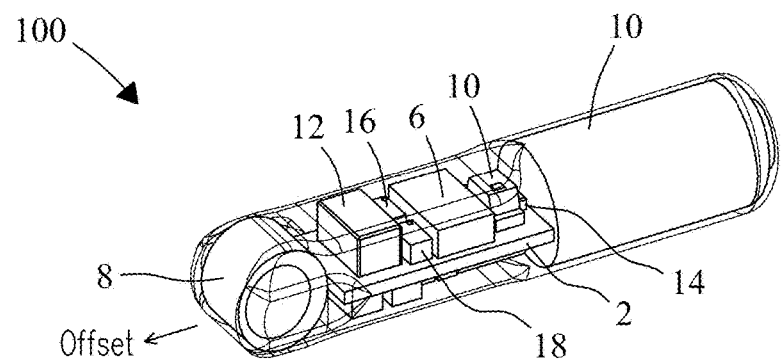
FIGS. 1a-1c show different views of an embodiment of the present invention.

FIG. 1a illustrates a top view of an injectable acoustic (sound-emitting) transmitter device (tag) 100 in assembled form showing exemplary components. While various components are described herein, components and configuration are exemplary and not limited. For example, in various embodiments, injectable acoustic tags of the present invention may include various form factors and shapes that allow the tags to be injectable and tailored for selected applications. "Form factor" refers to the physical arrangement, configuration, and dimensions of components in the injectable acoustic tags including, but not limited to, e.g., circuit boards, piezoelectric transducers, controllers, acoustic reflectors, inductors, capacitors, diodes, and capsules. In some embodiments, injectable tag 100 may have a generally elongated or cylindrical shape that permits the tag to be injectable into the host animal, but shapes are not intended to be limited. Components of tag 100 may be encapsulated within a coating that defines a capsule 4. Capsule 4 may be composed of a thermosetting polymer such as an epoxy (e.g., EPO-TEK® 301 epoxy, Epoxy Technology Inc., Billerica, Mass., USA) or a resin (e.g., Electrical Resin 5, 3M Company, St. Paul, Minn., USA). Capsule 4 may include an exemplary length of about 15 mm, but length is not limited. Diameter of capsule 4 at the widest point along the length may be about 3.4 mm. Final weight may be at or below about 228 mg.

In various embodiments, selected components of tag 100 may be mounted onto a circuit board 2 constructed of suitable or selected circuit board materials available commercially (e.g., Sierra Circuits, Inc., Sunnyvale, Calif., USA). Circuit board 2 materials may include, but are not limited to, e.g., a rigid material such as FR4 board with a thickness of about 0.008" or flexible materials such as flex board with a thickness of about 0.003". In various embodiments, circuit boards 2 of tag 100 may be configured with both a top side and a bottom side, each side of circuit board 2 configured with selected electrical circuits and/or device components. Circuit board 2 may include exemplary spacing widths and copper line widths for electrical circuits of about 0.003", but are not limited. As will be appreciated by those of ordinary skill in the art, circuit configurations and associated designs, and tag components may be altered without departing from the spirit and scope of the present invention. Thus, no limitations are intended.

Injectable tag 100 may include a controller 6 that controls operation of components and circuits of the tag. A piezoelectric transducer 8 may be positioned at a forward end of the tag so that the acoustic signal may be transmitted from the tag without encountering interference from tag components such as an inductor 12 or other components of the tag. In the figure, piezoelectric transducer 8 is shown electrically coupled to circuit board 2 but does not need to reside on circuit board 2. A power source 10 may be coupled to circuit board 2 to power components of the injectable tag. In some embodiments, power source 10 may be positioned at an end opposite to piezoelectric transducer 8 to minimize any potential blockage of the acoustic signal caused by the physical size of the power source 10. However, location is not limited. A capacitor 14 (e.g., a 1 µF capacitor) may act as a decoupling capacitor for the power source to help smooth any electrical noise. A first MOSFET transistor 16 may form part of a boost converter circuit described further herein. A second MOSFET transistor 18 and an inductor 12 (e.g., a 100 µH inductor) may form a drive circuit described further herein. A phototransistor 20 sensitive to infrared radiation may provide an optical link to an external programmer module (FIG. 3b) for receipt of commands that configure microcontroller 6 for operation.

Figure 1B:
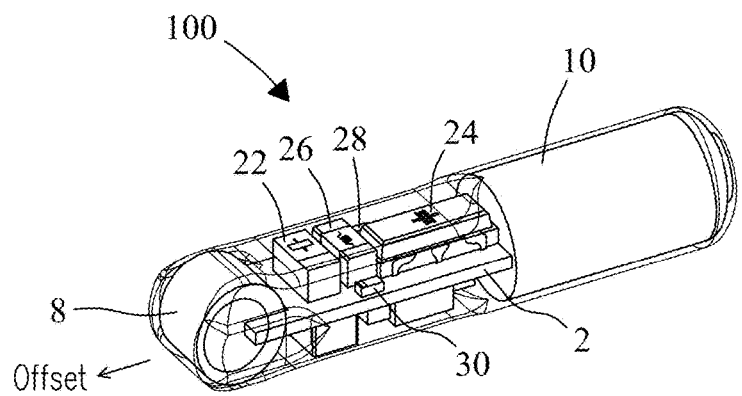

FIG. 1b illustrates a bottom view of injectable acoustic transmission tag 100 showing exemplary components on a bottom side of circuit board 2. A capacitor 22 (e.g., a 22 µF capacitor), an inductor 26 (e.g., a 47 µH inductor), and a diode 30 (e.g., a Schottky diode) together form part of a boost converter circuit described further herein. A resonator 24 (e.g., a 10 MHz ceramic resonator) may couple to the microcontroller (FIG. 1a) to produce a clock signal for controlling the operation of that microcontroller. A resistor 28 (e.g., a 1 MΩ resistor) may couple to the resonator to help stabilize the clock signal.

Figure 1C:
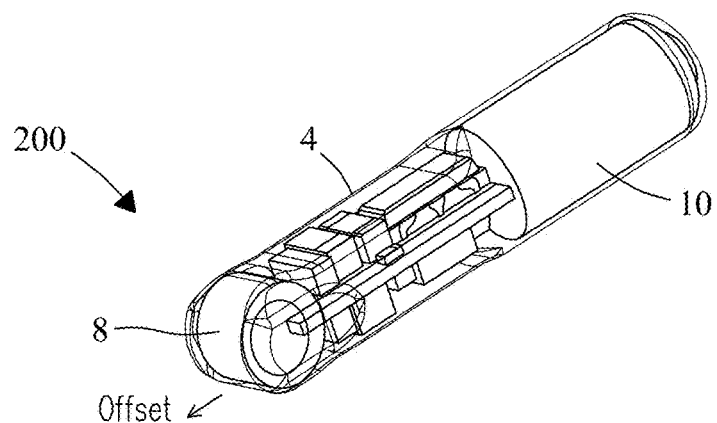

FIG. 1c shows an injectable acoustic transmission tag 200 of a "baseball bat" capsule design. In the instant embodiment, components of the tag are encapsulated in a capsule 4 that has an appearance of a baseball bat, with a narrowed front end (the "handle" of the "bat"), and a power source 10 positioned at a back end of the capsule (the "hitting end" of the "bat"). The narrowed front end reduces the weight and volume of injectable acoustic transmission tag 200. Capsule 4 may have an exemplary length of about 15 mm, but is not limited. Diameter of tag 200 at the widest point along the length of the capsule (i.e., at the location of the power source 10) is about 3.4 mm. Average weight may be between about 216 mg and about 218 mg when EPO-TEK 301 epoxy or 3M Electrical Resin 5 is used as the coating material.

Figure 2A:
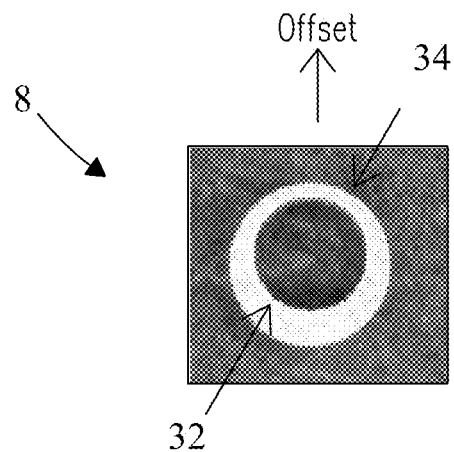
FIGS. 2a-2c show different views of an offset piezoelectric transducer of the present invention.

FIG. 2a shows a top view of a piezoelectric tube transducer 8 of an offset inner circumference (IC) design. Piezoelectric transducer 8 converts electrical energy from the power source (FIGS. 1a-1c) into ultrasonic energy (i.e., an acoustic signal) that is transmitted to a receiver (not shown). Piezoelectric transducers 8 may be constructed of any suitable piezoelectric ceramic material including, e.g., lead zirconate titanate (PZT), lead magnesium niobate-lead titanate (PMN-PT), or lead-free ceramic materials such as sodium potassium niobate (KNN) and bismuth sodium titanate (NBT). IC-offset piezoelectric transducer 8 may include an inner wall 32 and an exterior (outer) wall 34 that are not concentric. The circumference of inner wall 32 may be offset from the center position of exterior wall 34. When assembled into the injectable tag, the IC-offset piezoelectric transducer 8 may be oriented with the thinnest portion of the transducer wall facing the front of the tag. The offset maximizes energy delivered from the piezoelectric transducer in the direction of the offset. Dimensions of piezoelectric transducer 8 may be tailored to provide a selected operation frequency. Frequencies are not limited. In some embodiments, the resonance frequency is selected to be about 416.7 kHz. In the instant embodiments, IC-offset piezoelectric transducer 8 may include an exterior (outer) wall 34 with an O.D. of about 2.4 mm to about 2.6 mm, an inner wall 32 with an I.D. of about 1.7 mm to about 1.9 mm, and a thickness in the offset direction of about 0.15 mm. Dimensions of piezoelectric transducer 8 may include a tolerance at least about ±0.05 mm. In some embodiments, piezoelectric transducer 8 may have a resonance frequency about 10 kHz to 50 kHz higher than the frequency of the drive signal that drives piezoelectric transducer 8. The higher frequency compensates for frequency downshifts that may be caused by the epoxy or resin coating on the piezoelectric transducer.

Figure 2B:
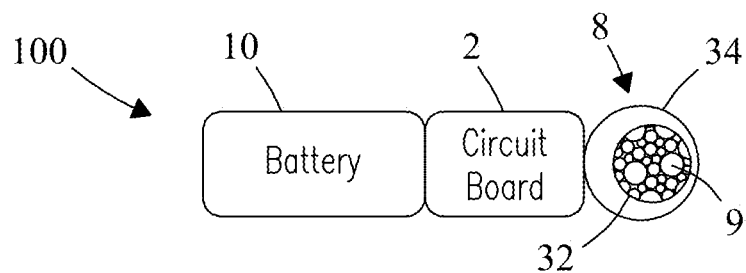

FIG. 2b is a schematic showing the acoustic transmission device 100 in assembled form configured with an inner circumference (IC)-offset piezoelectric transducer 8 positioned at a front end of the device, a power source (battery) 10 at a back end of the device, and a circuit board 2 in the middle section. IC-offset piezoelectric transducer 8 may include an inner wall 32 with an inner circumference (IC) and an exterior (outer) wall 34 that are offset in the forward transmission direction. The offset may enhance the source level of the acoustic signal when the piezoelectric transducer is polarized (activated) along the thickness direction. Piezoelectric transducer 8 may include a closed-cell foam 9 composed of, e.g., EPDM rubber or a like elastomer positioned so as to be bounded by inner wall 32 of piezoelectric transducer 8 that enhances acoustic properties of piezoelectric transducer 8. Dimensions of IC-offset piezoelectric transducer 8 are selected that maximize the transmission range of the acoustic signal. IC-offset piezoelectric transducer 8 is preferably oriented so that the direction of the IC-offset is directly pointed towards a receiver (hydrophone) (not shown) that detects the acoustic signal emitted by the piezoelectric transducer 8, but is not limited.

Figure 2C:
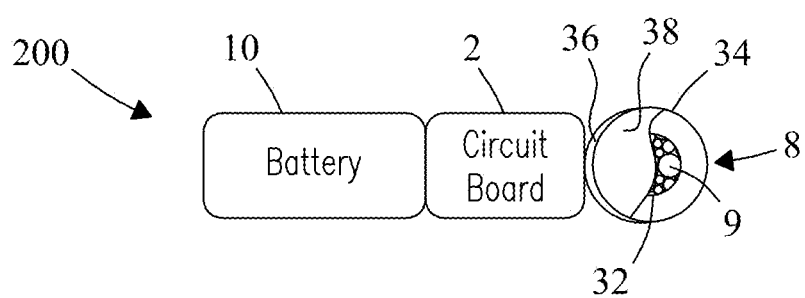

FIG. 2c shows a schematic of an injectable acoustic transmission device 200 of a baseball bat design. In the figure, piezoelectric transducer 8 may include an inner wall 32 and an exterior (outer) wall 34 that are concentric or that are offset as detailed previously herein. Injectable tag 200 may also include an acoustic reflector 36 attached behind piezoelectric transducer 8 in front of power source (battery) 10 and circuit board 2. Acoustic reflector 36 reflects acoustic signals emitted from piezoelectric transducer 8 and enhances transmission in the forward direction from the acoustic (tag) 200 as detailed further herein. In some embodiments, acoustic reflector 36 may include or be composed of an ultra-low density material such as EPDM closed-cell (~0.3 mm thick) foam, which may be attached to the back surface of piezoelectric transducer 8 in front of circuit board 2. The foam introduces an interface with a large acoustic impedance mismatch greater than about $20 \times 10^6$ kg/(m²·s) that redirects acoustic energy towards the front end of injectable tag 200. In addition, acoustic reflector 36 enhances the source level of the acoustic energy output from piezoelectric transducer 8 along the forward 180 degree wavefront by at least a factor of about 0.5 dB to about 1 dB on average, but acoustic energy values are not intended to be limited. In various embodiments, acoustic reflector 36 may include various selected thicknesses. In some embodiments, width of acoustic reflector 36 may be below about 1.5 mm to avoid blocking acoustic signals emitted from the two (i.e., left and right) sides of piezoelectric transducer 8. Thickness of acoustic reflector 36 depends in part on the size of the pores within the closed-cell foam. Thickness is preferably 2 to 3 times the size of pores within the reflector material to ensure acoustic waves encounter EPDM/air interfaces within the reflector foam at least once in order to maximize effectiveness of the reflector.

Piezoelectric transducer 8 may include a closed-cell foam 9 composed of, e.g., EPDM rubber or a like elastomer positioned so as to be bounded by inner wall 32 of piezoelectric transducer 8 that enhances acoustic properties of piezoelectric transducer 8. In some embodiments, piezoelectric transducer 8 may include end caps 38 of a selected thickness (e.g., ~0.2 mm) positioned at respective flat ends of transducer 8. End caps 38 may include or be composed of a selected metal such as copper (Cu) metal. End caps 38 may be bonded to piezoelectric transducer 8 using, e.g., a non-conductive epoxy. End caps 38 can serve to enhance the source level of the acoustic signal emitted from flat ends of transducer 8.

Figure 3A:
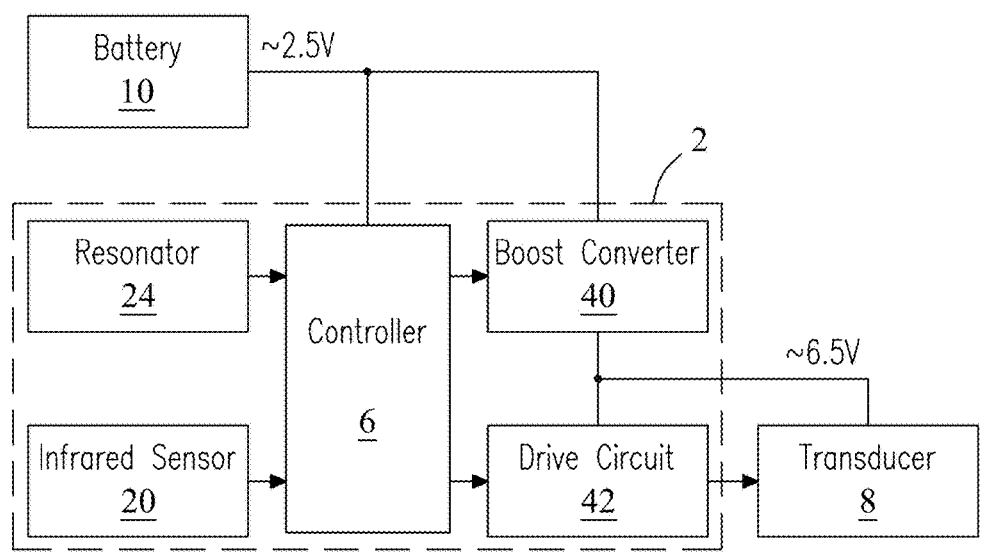
FIG. 3a is a block diagram showing electrical components of an embodiment of the present invention.

FIG. 3a is a block diagram showing various components of injectable acoustic tags of the present invention. Tags may include a controller component 6 (e.g., a 6-pin microcontroller). The term "microcontroller" does not imply or limit selected dimensions for this component. A ceramic resonator 24 may be coupled to microcontroller 6 and used to generate a clock signal for coordinating operation of various circuits. An infrared sensor 20 may provide an optical link that receives and delivers configuration commands from an external infrared programmer module (FIG. 3b) to controller 6. Configuration commands may specify various parameters for the operation of the microcontroller, including, but not limited to, e.g., tag codes, period between transmissions, and other operation parameters. A boost converter circuit 40 enhances voltages from power source 10 and delivers the enhanced voltages to a drive circuit 42. Drive circuit 42 drives piezoelectric transducer 8 to transmit an encoded acoustic signal at a specified frequency, as detailed further herein.

Figure 3B:
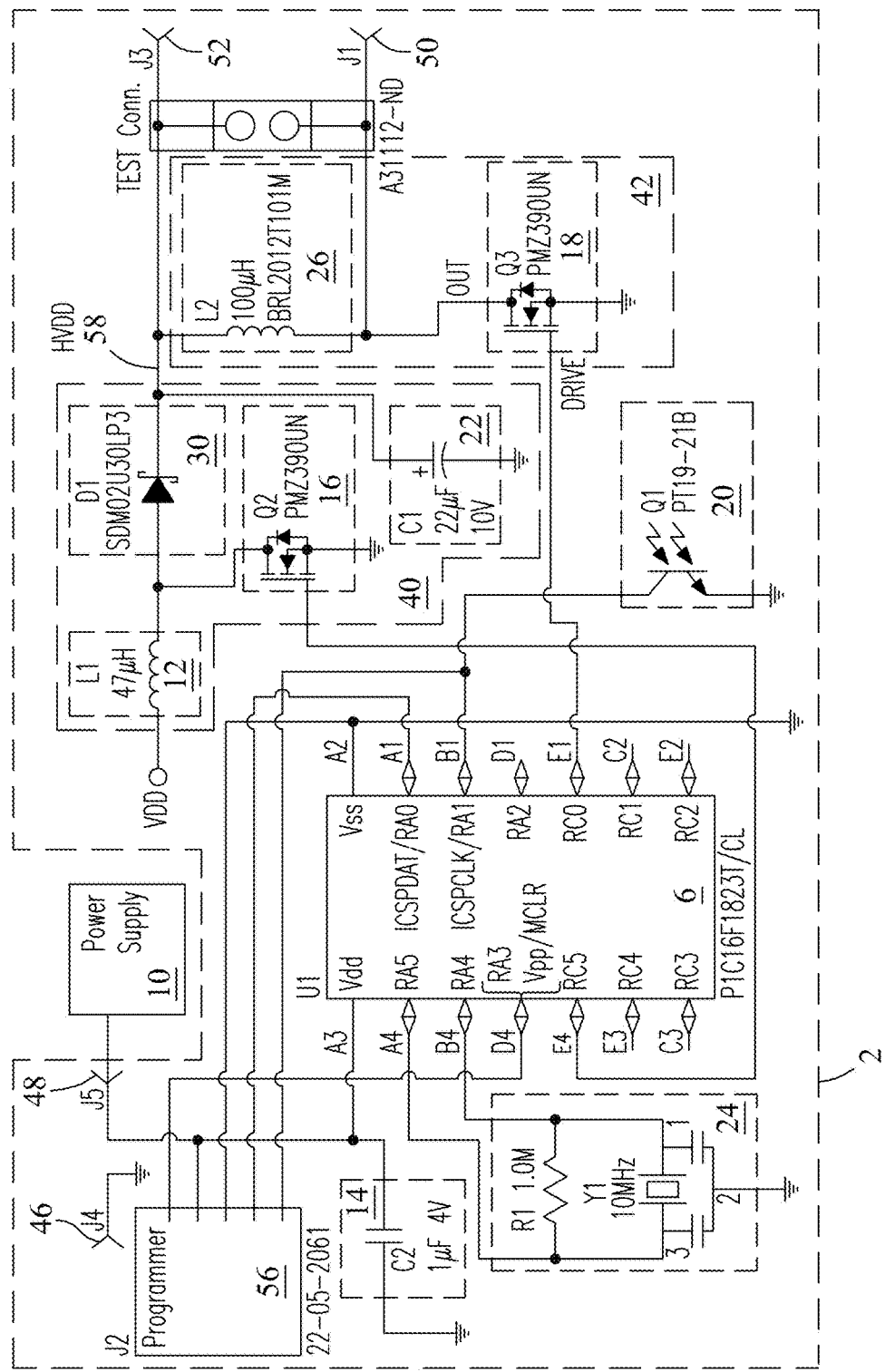
FIG. 3b is a circuit diagram of one embodiment of the present invention.

FIG. 3b shows an exemplary block diagram illustrating circuits and associated device components for injectable acoustic tags of the present invention. Components described hereafter provide reduced physical dimensions and weights to the tag and allow circuits to operate at comparatively high efficiencies given their smaller sizes. However, components are not intended to be limited. All components as will be selected by those of ordinary skill in the art in view of the description are within the scope of the present invention. No limitations are intended.

Injectable acoustic transmission devices (tags) of the present invention may include a controller (U1) 6 (e.g., a model PIC16F1823T/CL 8-bit, 8K flash, programmable microcontroller in a chip-scale package, Microchip Technologies, Chandler, Ariz., USA) with a low current draw (e.g., 20 nA in sleep mode, or 300 nA in sleep mode with the watchdog timer active). Controller 6 is a programmable component that controls operation of circuits and electrical components within injectable acoustic tag 100. Controller 6 may operate from input voltages between about 1.8 V and about 3.6 V. Selected voltages are compatible with a power source (battery) 10. Controller 6 may include modules or components such as, e.g., an internal oscillator; sleep mode; interrupt-on-change capability; a fixed voltage reference; a temperature sensor; timers; pulse width modulators; and a Universal Asynchronous Receiver/Transmitter (UART). Controller 6 generates control signals for both a boost converter circuit 40 and a drive circuit 42.

Power source (battery) 10 may be connected to terminals (J4) 46 and (J5) 48 on either each side of circuit board 2 during assembly. Piezoelectric transducer 8 may be connected to terminals (J3) 50 and (J1) 52 on opposite sides of circuit board 2 at an end opposite power source 10. A bypass (or decoupling) capacitor (C2) 14 (e.g., a model #AMK063ABJ105MP-F 1-μF 4V X5R 20% 0201 tantalum capacitor, Taiyo Yuden Co., Ltd, Schaumburg, Ill., USA) may be used to help filter any electronics noise on power source 10 and reduces maximum peak currents drawn from power source 10 when controller 6 or boost converter circuit 40 draws current.

A resonator (Y1) 24 (e.g., a model CSTCE10M0G52-R0 10.0 MHz SMD ceramic resonator, Murata Manufacturing Co., Ltd., Nagaokakyo, Kyoto Prefecture, Japan) may be coupled on the input side of controller 6 to generate a precise clock signal with a selected precision (e.g., ±0.5% precision). Controller 6 may use the clock signal to generate control signals for boost converter circuit 40 and drive circuit 42. Due to the 10 MHz rating of resonator (Y1) 24, control signals for drive circuit 42 permit the circuit to generate an acoustic signal at desired modulation frequencies, e.g., 416.7 kHz. Control signals generated by controller 6 can be synchronized to 416.7 kHz when controller 6 uses the clock signal as its input timing source. The clock signal controls and modulates the (modulation) frequency of piezoelectric transducer 8. A resistor (R1) 28 (e.g., a model CRCW02011M00FKED, 1.0 MΩ, 1/20 W, 5% 0201 SMD resistor, Vishay Intertechnology, Inc., Malvern, Pa., USA) may be placed in parallel with resonator 24 to reduce startup time and improve stability of the generated clock signal.

A unidirectional infrared sensor or phototransistor (Q1) 20 (e.g., model PT19-21B Flat Black Mini (3-mm) SMD Phototransistor, Everlight Electronics Co., Ltd., Taipei, Taiwan) may couple to controller 6 using an input pin such as a UART pin (not shown) configured with "interrupt-on-change" capability that produces an interrupt upon a positive and/or negative change in logic level. Pin selections are not limited.

Phototransistor 20 is sensitive to infrared light and provides an optical link that may be used to interface the injectable tags to an external infrared Integrated Circuit Serial Programmer (ICSP) module (Programmer) 56 (e.g. a MPLAB ICD 3 programmer, Microchip Technologies, Chandler, Ariz., USA). Programmer module 56 may load configuration and programming information including firmware code into controller 6. Programmer 56 may connect to an RS-232 serial port (not shown) of a host computer (not shown). The external infrared programmer module may include an infrared LED (not shown) that indicates when the programmer is "on" or "off". For example, the LED is "on" when the transmit line is logic 0 (positive voltage), and "off" when the transmit line is logic 1 (negative voltage). Writing bytes to the serial port of the host computer transmits those bytes across the infrared link 20 (i.e., from the infrared LED to phototransistor 20) into the tag controller 6. The infrared link 20 provides no direct feedback to the host computer.

Phototransistor 20, when activated by infrared light, receives configuration commands through the optical link and transfers the commands to controller 6. Delivery of configuration commands into controller 6 configures various parameters of the tag including, e.g., tag codes, transmission period, and other parameters for operation prior to or following injection of the tag into the host animal. The infrared link is reliable, simple, requires a minimum number of components, and avoids false triggering problems after injection of the tag into the host animal.

Data transmission protocol over infrared link 20 may consist of a 2-second serial break followed by a stream of bytes. The serial break turns on the infrared LED on infrared programmer module 56 for an extended period of time so that microcontroller 6 may sense the infrared light and prepare to configure parameters. The stream of bytes may consist of an initial check byte, a byte that indicates the total number of data bytes in the transmission, and the selected data bytes. Data bytes may specify values for the internal microcontroller parameters in a predefined order. The host computer may run an exemplary MATLAB (MathWorks, Inc., Natick, Mass., USA) software program that delivers configuration information through a serial port into the infrared programmer. While MATLAB is described, other computer programming languages may be used. No limitations are intended.

In some embodiments, phototransistor 20 provides a transfer rate of about 300 baud. However, parameter transfer rates are not intended to be limited. Phototransistor 20 generally operates as a simple pull-down transistor triggered by infrared light. Controller 6 may activate a weak internal pull-up resistor to generate a logic high input on the input pin (e.g., a UART pin) when phototransistor 20 is not activated. Controller 6 may disable phototransistor 20 to save power by driving the input pin to ground.

Boost converter circuit 40 enhances voltages output from power source (battery) 10 into higher voltages. Drive circuit 42 may use these higher voltages to drive piezoelectric transducer 8. Boost converter circuit 40 may include an inductor (L1) 12 (e.g., a model #GLFR1608T470M-LR 47 µH, 35 mA 20% 0603 inductor, TDK Corp., New York, N.Y., USA) that stores magnetic energy as an electronic current, a MOSFET transistor (Q2) 16 (e.g., a model PMZ390UN N-channel type 30V, 1.78 A SOT-883 MOSFET, Fairchild Semiconductor, San Jose, Calif., USA) that switches on and off repeatedly, a diode (D1) 30 (e.g., a model# SDM02U30LP3 30V diode, Diodes Incorporated, Plano, Tex., USA) that conducts current primarily in one direction toward the output, and a capacitor (C1) 22 (e.g., a model #298D226X0010M2T 22-µF 10V 20% 0603 tantalum capacitor, Vishay Sprague, Malvern, Pa., USA) that stores an elevated voltage. MOSFET transistor (Q2) 16 is coupled to the output of controller 6.

When transistor (Q2) 16 is switched "on" by controller 6, current begins to increase in inductor (L2) 26. When transistor (Q2) 16 is switched back "off" by microcontroller 6, current from inductor (L1) 12 is delivered through diode (D1) 30 into capacitor (C1) 22, which charges capacitor (C1) 22. Controller 6 may switch transistor (Q2) 16 "on" and "off" a selected number of times to charge capacitor (C1) 22 to a desired value. Capacitor (C1) 22 may have a minimum rating of about 10 V and a capacitance of at least about 22 µF to minimize voltage drops while drive circuit 42 is drawing current. Boost converter circuit 40 delivers a suitable drive voltage (HVDD) 58 as an input to drive circuit 42.

A drive circuit 42 may be coupled on the output side of microcontroller 6 to facilitate transmission of the acoustic signal from piezoelectric transducer 8. Drive circuit 42 may define the signaling levels and signaling approach of the injectable tag. Drive circuit 42 may include an inductor (L2) 26 (e.g., a model BRL2012T101M 100 µH 85 mA 20% SMD Inductor, Taiyo Yuden Co., Ltd, Schaumburg, Ill., USA) that stores magnetic energy as an electronic current, and a MOSFET transistor (Q 3) 18 (e.g., a model PMZ390UN N-channel type 30V, 1.78 A SOT-883 MOSFET, Fairchild Semiconductor, San Jose, Calif., USA) that switches on and off. Transistor (Q3) 18 may be coupled to an output pin of controller 6. Drive circuit 42 may attach to terminals (J1) 50 and (J3) 52 of circuit board 2. Voltage at connector 52 is tied to elevated voltage (HVDD) 58.

When transistor (Q3) 18 is switched "on" by microcontroller 6, current begins to increase in inductor (L2) 26. Voltage at connector 52 may be set to ground. When transistor (Q3) 18 is then switched "off" by microcontroller 6, inductor (L2) 26 and piezoelectric transducer 8 conceptually form a resonant LC circuit. Voltage at connector 52 of piezoelectric transducer 8 may oscillate at a frequency determined by the inductance of inductor (L2) 26 and the characteristic capacitance of piezoelectric transducer 8. Oscillation frequency may be greater than the desired modulation frequency of the acoustic signal. Voltage on connector 52 may increase above drive voltage (HVDD) 58 and then return to near ground. Transistor (Q3) 18 may be switched back "on" by microcontroller 6 to prevent further oscillations from taking place in piezoelectric transducer 8. Voltage differences across piezoelectric transducer 8 connected between terminal 50 and terminal 52 may thus range between negative and positive values.

Controller 6 may switch transistor (Q3) 18 "on" and "off" in a particular pattern so that drive circuit 42 can apply the desired electrical signals to the piezoelectric transducer and generate the correct acoustic waveform. To transmit a series of acoustic pulses representing one bit of the tag code, microcontroller 6 may apply a square wave to transistor (Q3) 18 with the desired modulation frequency (e.g., 416.7 kHz). The duty cycle of the square wave is typically 33% so that transistor (Q3) 18 is switched "on" for one-third of each modulation period, and inductor (L2) 26 and piezoelectric transducer 8 are allowed to oscillate for two-thirds of each modulation period. When transitioning from a logic "0" bit to a logic "1" bit, or vice versa, microcontroller 6 may delay a next pulse by a time period that is one-half of a modulation period. This procedure produces an acoustic signal from piezoelectric transducer 8 that includes encoded binary data implemented, e.g., by way of phase-shift keying (PSK).

In various embodiments, separate MOSFET transistors (Q2) 16 and (Q3) 18 may be used rather than a single dual-channel MOSFET transistor to facilitate layout and design on circuit board 2, but is not intended to limited thereto. Further, components on circuit board 2 described herein may be placed in close proximity to minimize length of the tags. For example, resonator 24 and inductor (L2) 26 may be in contact after board assembly without problems since resonator 24 has a perimeter surrounded by a nonconductive material.

Figure 4:
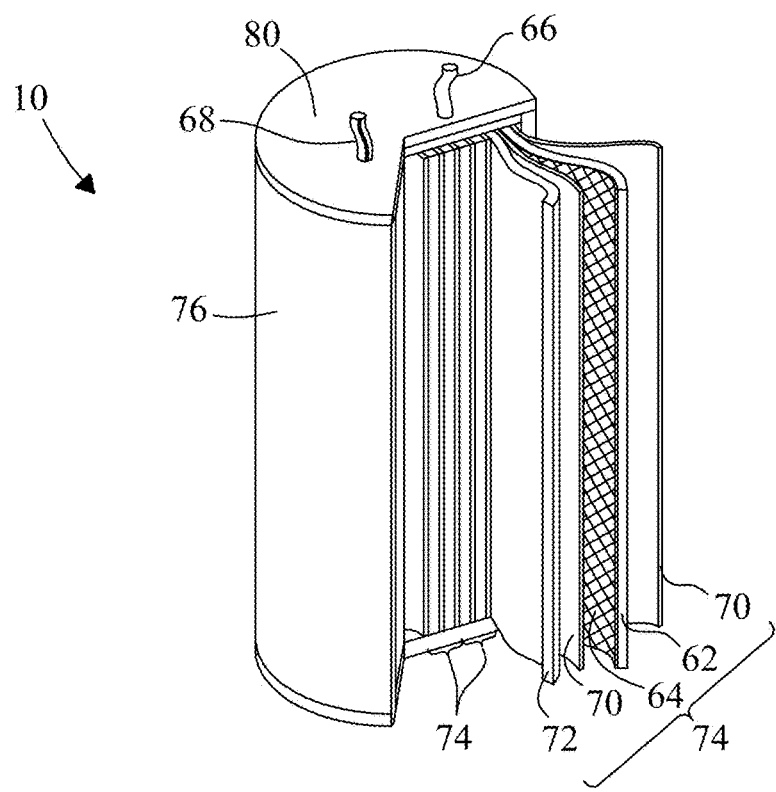
FIG. 4 is a cross-sectional view of a power source of the present invention.

FIG. 4 shows a cross-sectional view of the custom power source (battery) 10 (termed MB306 hereafter) that supplies power to acoustic transmitter (tag) (FIGS. 1a-1c) and electrical components of the present invention. Battery 10 may include a cathode 62 that includes a composite of carbon monofluoride as an active cathode material mixed with a conductive carbon in a binder such as polytetrafluoroethylene (PTFE) to form a free-standing electrode. In an exemplary embodiment, composite cathode 62 may include 85 wt % active cathode material, 10 wt % conductive carbon (e.g., SUPER-P® conductive carbon, Timcal Ltd., Bodio, Switzerland), and 5 wt % PTFE. The composite cathode material when dried may be introduced (e.g., pressed) onto a current collector support 64 constructed of aluminum (or other metal) mesh to form the composite cathode electrode 62. Current collector 64 provides electron transfer between respective cathode 62 and anode 72 electrodes in battery 10. A metal lead 66 [e.g., positive (+) lead] constructed, e.g., of enameled copper wire (e.g., 0.13 mm O.D.)] which may be soldered to current collector 64. Composite cathode 62 (with or without a copper wire lead 66) may be divided into sections with selected dimensions. Individual cathode sections 62 may be introduced between two layers of a separator 70 material composed, e.g., of a micro-porous polypropylene (e.g., Separator 2500, Celgard LLC, Charlotte, N.C., USA) that electrically isolates cathode 62 from anode 72 in individual cathode/anode laminates (couples) 74. Anode 72 may include or be composed of lithium metal [FMC lithium, Charlotte, N.C., USA] with selected thicknesses. In some embodiments, thickness of the anode 72 may be about 0.15 mm, but is not limited. An anode lead 68 (e.g., 0.13 mm O.D.) may be constructed of, e.g., copper, and coupled to anode 72 by directly pressing lead 68 onto the lithium metal.

Multiple individual electrochemical cathode/anode couples (laminates) 74 each comprising a cathode 62 and an anode 72 may be bundled together and introduced into a container 76. In various embodiments, laminates 74 may include a thickness between about 0.21 mm and about 0.24 mm, but dimensions are not intended to be limited. Container 76 may be of a generally cylindrical shape and constructed of a high strength material such as a fluoropolymer, e.g., ethylene tetrafluoroethylene (ETFE) sold commercially under the tradename TEFZEL® (DuPont, Wilmington, Del. USA) or aluminum. The polymer includes a high melting temperature, a high flow rate, and excellent chemical and electrical resistance properties. With laminates 74 introduced into container 76, container 76 may be filled with an electrolyte 78 (up to 35 mg on average) to minimize time delays characteristic of conventional CF electrochemical cells. In various embodiments, electrolyte 78 may include or be composed of, e.g., 1M lithium hexafluorophosphate ($LiPF_6$) that is disbursed in a 1:1 volume ratio [EC:DMC] of ethylene carbonate (EC) in dimethyl carbonate (DMC). Container 76 may then be capped with a polymer lid 80 after inserting wire leads 66 and 68 through holes (not shown) introduced in lid 80. Battery 10 when assembled may be sealed, e.g., with an epoxy or other thermosetting polymer. TABLE 1 shows physical properties of the battery of the present invention compared against conventional (SR416) silver oxide (Qty=2 stacked) batteries.

TABLE 1 lists typical physical properties of the MB306 battery compared with conventional silver oxide batteries.

| Battery | Outer Diameter (mm) | Length (mm) | Volume $(mm)^3$ | Package Container Weight (mg) | Wall Thickness (mm) | Total Weight (mg) |
|---|---|---|---|---|---|---|
| MB306 | 3.0 | 6.0 | 42 | 17 | 0.15 | 75 |
| SR416 (Qty 2) | 4.8 | 3.2 | 58 | n/a | n/a | 260 |

As shown in the table, battery 10 may have an outer diameter of 3.0 mm and a length of 6.0 mm (tolerance ±0.2 mm). Thickness of the wall of battery 10 capsule wall and lid is about 0.15 mm, but is not limited. The battery has a low mass [approximately 0.075 g (±0.02 g)] and a low volume [approximately 0.042 $cm^3$]. Current weight of the battery represents ~71% reduction in the weight burden for tagged animals compared with prior art designs. TABLE 2 compares performance properties of the MB306 battery against commercial silver oxide batteries.

TABLE 2 lists typical operating and performance parameters of the MB306 battery

| Open Circuit Voltage (OCV) | Impedance (@ 1 kHz) | | Total Capacity (Cut-off @ 1.5 V) | Energy Density | |
|---|---|---|---|---|---|
| | @ OCV | @ CCV (4.3 kΩ lead) | | | |
| (Volts) | (Ω) | (Ω) | (mAh) | Wh/kg | Wh/L |
| 2.85-3.25 | ≤200 | 6-10 | ~7.3 | 231 | 408 |

Figure 5:
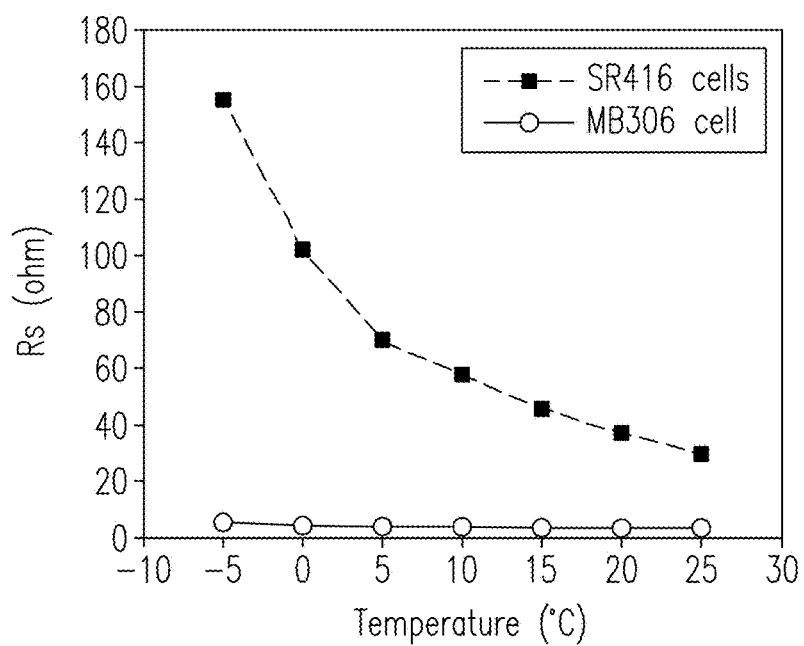
FIG. 5 compares resistances for a power source of the present invention against a conventional power source at temperatures ranging from −5° C. to 25° C.

Battery 10 may include a discharge rate of about 86 mA/g (1 $mA/cm^2$) at 23° C. Cut-off voltage may be about 1.5 V. Battery 10 may also deliver a gravimetric energy density of 231 Wh/kg (volume energy density of 408 Wh/L), an enhancement of greater than 133% over conventional SR416 batteries. In operation, battery 10 may also deliver a stable output voltage of at least 2.85 volts and stable pulse current over a wide temperature range from 0° C. to 25° C. This output voltage is nearly 1 V higher than commercial 416 batteries, which removes the need to stack batteries as in prior JSATS transmitters or the need for extra electronics to achieve a 3 V output. Battery 10 may also have an intrinsically lower impedance compared with SR416 cells used in prior art JSATS transmitters. FIG. 5 compares the impedance of the battery of the present invention against conventional SR416 cells. Data show the performance of the battery of the present invention is superior to SR416 cells over a wide temperature range from −5° C. to 25° C. and beyond. Additional aspects of the power source are detailed by Chen et al. in a publication entitled "Micro-Battery Development for Juvenile Salmon Acoustic Telemetry System Applications", which reference is incorporated herein in its entirety.

Battery 10 may provide a long service lifetime and steady voltage performance for the active transmission device compared to conventional transmitters known in the art that employ dual SR416 cells. Lifetimes of the power source 10 are selectable based on the selection of pulse rate (current) intervals (PRIs). Pulse currents are not limited. In some embodiments, for example, the battery may be configured to deliver a pulse current (PRI) every 3 seconds, providing an active lifetime rating of at least 20 days. In some embodiments, the battery may be configured to deliver a pulse current (PRI) every 5 seconds, providing an active lifetime rating of at least 30 days. Longer lifetimes may be selected: 7 seconds: 40 days; and 10 seconds: 60 days. No limitations are intended.

Figure 6A:
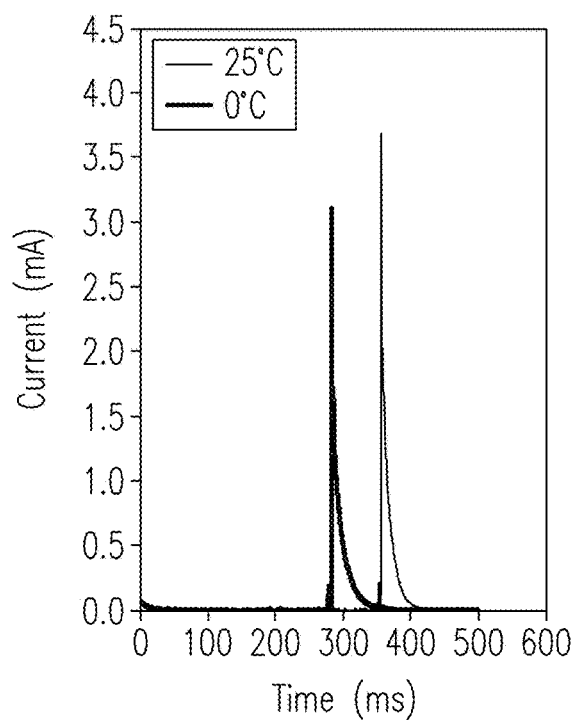
FIGS. 6a-6b compare the transmitter pulse current for the power source of the present invention against a conventional power source at 25° C. and 0° C., respectively.
Figure 6B:
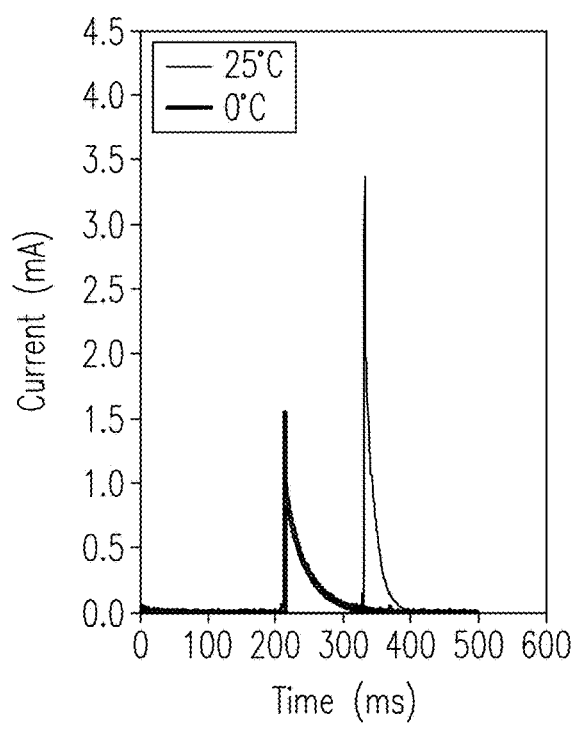

FIG. 6*a* compares pulse currents (mA) generated by the MB306 battery of the injectable tags at 25° C. and 0° C. FIG. 6*b* compares pulse currents generated by conventional silver oxide batteries at 25° C. and 0° C. Results show amplitudes of pulse currents of the MB306 battery are both greater and delivered more rapidly than those obtained with silver oxide cells.

Figure 7:
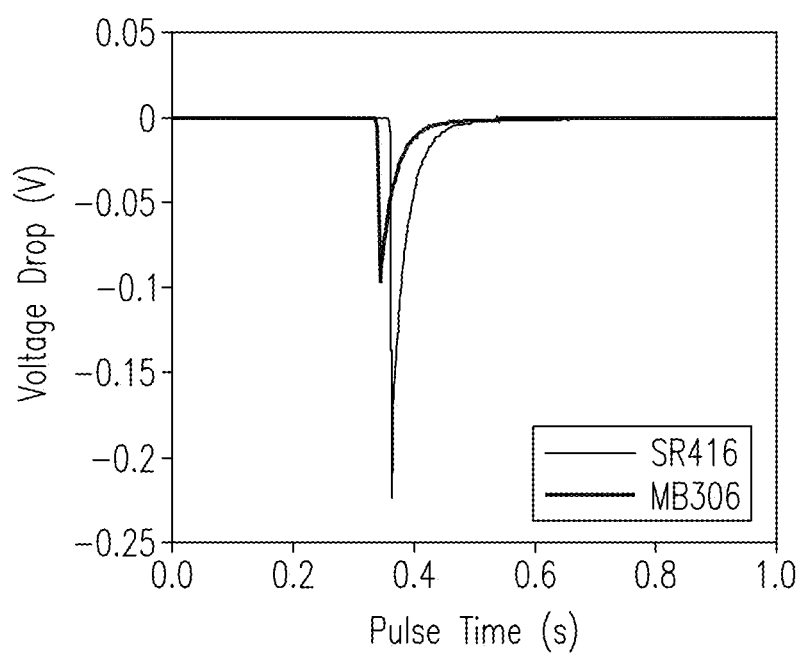
FIG. 7 compares the voltage drop for the power source of the present invention against a conventional power source during a pulse transmission at 0° C.

FIG. 7 compares cell voltages for the MB306 battery upon a pulse transmission at 0° C. against conventional SR416 silver oxide cells. Data show that voltage drops for the SR 416 cells are about a factor of two greater at low temperatures compared with the MB306 battery. When in an inactivated state, the injectable acoustic tag of the present invention maintains a battery capacity of greater than 85% for 12 months after assembly when stored at room temperature (23° C.).

Controller Firmware

Source code loaded into the controller (FIG. 3*a*) memory may be used to control the functionality and operation of the injectable acoustic tag. Source code may be programmed (e.g., using the MPLAB integrated development environment or like software tools) on a host computer in assembly language (e.g., PIC assembly language) or a higher level language (e.g., C programming language). The software tools on the host computer create the firmware, e.g., in binary or derivative code (e.g., hexadecimal or hex) that can be programmed into the controller on the circuit board (FIG. 1). Source code may be divided into various exemplary modules including, but not limited to: main: specifies configuration bits, declares variables, and executes initial instructions after the controller is reset; initialize: clears all working variables; calibrate: calibrates timers (e.g., the watchdog timer) used to set the transmission frequency; waiting: periodically checks the infrared sensor until the tag is configured; storage: keeps the infrared sensor active until the tag is configured. hibernate: waits for a specified amount of time (e.g., 30 days) before starting acoustic transmission; running: waits for a specified period (e.g., 3 seconds) between acoustic transmissions; transmit: activates the boost converter circuit (FIG. 3*a*) and the drive circuit (FIG. 3*a*) to generate the desired acoustic signal on the piezoelectric transducer (FIG. 1); program: reads configuration data from the infrared link and sets the operating mode and other parameters; debug: contains code for development purposes; and tables: contains lookup tables for performing arithmetic operations required to compute temperatures or other sensor data. Controller firmware may contain one or more parameters that control the functionality and operation of the tag. These parameters may be initialized to default values when the microcontroller powers up for the first time, and later configured to new values via the infrared link. TABLE 3 lists exemplary parameters that may be stored in the controller memory to control operation of the injectable acoustic transmission devices (tags).

TABLE 3 lists exemplary parameters in controller memory, with associated memory requirements, for operation of injectable acoustic transmission devices (tags).

| NAME | BYTES | DESCRIPTION |
|---|---|---|
| NextState | 1 | Specifies the operating mode of the controller. The state contains a series of bits whose functions are explained in the source code. Common values are as follows:<br>04 hex: place controller in waiting mode<br>08 hex: place controller in storage mode<br>11 hex: calibrate, then hibernate, then transmit<br>21 hex: calibrate, then transmit |
| RunInterval | 2 | Pulse rate interval in units of 6.5536 ms. The least significant byte is first. For short pulse rate intervals, the value may be decreased to compensate for delays in the controller. |
| HibeTotal | 2 | Hibernate duration in units of 1.9089 hr. The least significant byte is first. |
| ChrgTable | 6 | A table of charge durations vs. battery voltage in units of 204.8 μs. A first value specifies charge duration of the boost converter for a lowest range of battery voltages. A second value may specify charge duration for a second lowest range of battery voltages, etc. Higher values result in a higher source level but also increase energy consumption. The relationship may be characterized empirically. |
| CalInterval | 2 | Number of transmissions between calibrations. Controller may calibrate timers to ensure that pulse rate interval remains accurate. The same parameter value may be used in hibernate mode to specify number of 256-second intervals between calibrations. The least significant byte may be first. |
| XmitCycles | 1 | Cycles per bit, minus two. The value should be 8 for backward compatibility. |
| XmitInsert | 1 | Index to insert temperature and CRC (check code) in tag code B, or "0" if no insertion is performed. Temperature may use 5 bits and CRC may use 8 bits. |
| XmitState | 1 | Parameter may be "0" when changing XmitCode values. |
| XmitCode | 64 | Table of transmit codes. Each value specifies one bit of tag code A, and one bit of tag code B, as listed below, where bit 0 is the least significant bit:<br>bit 0: transmit bit for code A<br>bit 1: contains 1 at the last bit position for code A<br>bit 4: transmit bit for code B<br>bit 5: contains 1 at the last bit position for code B |

TABLE 3-continued lists exemplary parameters in controller memory, with associated memory requirements, for operation of injectable acoustic transmission devices (tags).

| NAME | BYTES | DESCRIPTION |
|---|---|---|
| CRC Table | 32 | Table of CRC codes that correspond to various temperatures. |

Sensor Data

Controller (FIG. 3a) may contain an internal temperature sensor. The controller may embed a 5-bit temperature value (or other sensor value of possibly different length) within one or more tag codes that are transmitted by the piezoelectric transducer to the receiver. Due to the manner in which the controller compensates for variations in the battery voltage, the temperature sensor output may output a numeric value from 0 to 31 that varies with temperature but is not an actual temperature in degrees Celsius. Calibration for each tag may be performed off-board to determine the relationship between numeric values and actual temperatures, e.g., by recording numeric values at several different temperatures. Controller source code may perform the required on-board arithmetic to remove effects of the battery voltage on the temperature data. This procedure may be run, e.g., from the running module described previously herein. To enhance performance, the source code may implement several arithmetic operations as table lookups, but is not limited thereto. No limitations are intended.

Transmission Detection Range

Acoustic signals transmitted by tags of the present invention may include a detection range of up to about 1 km (3,280 ft) in fresh water. However, no limitations are intended. For example, in locations with a relatively large amount of background noise, such as immediately downstream of a dam spillway, signals may be transmitted about 100 meters. In other locations with a relatively small amount of background noise, such as the middle of a lake, signals may be transmitted up to about 500 meters. However, distances are not intended to be limited. Tag signals can be encoded for maximum strength to improve range and resolution.

Beam Transmission Patterns

Figure 8:
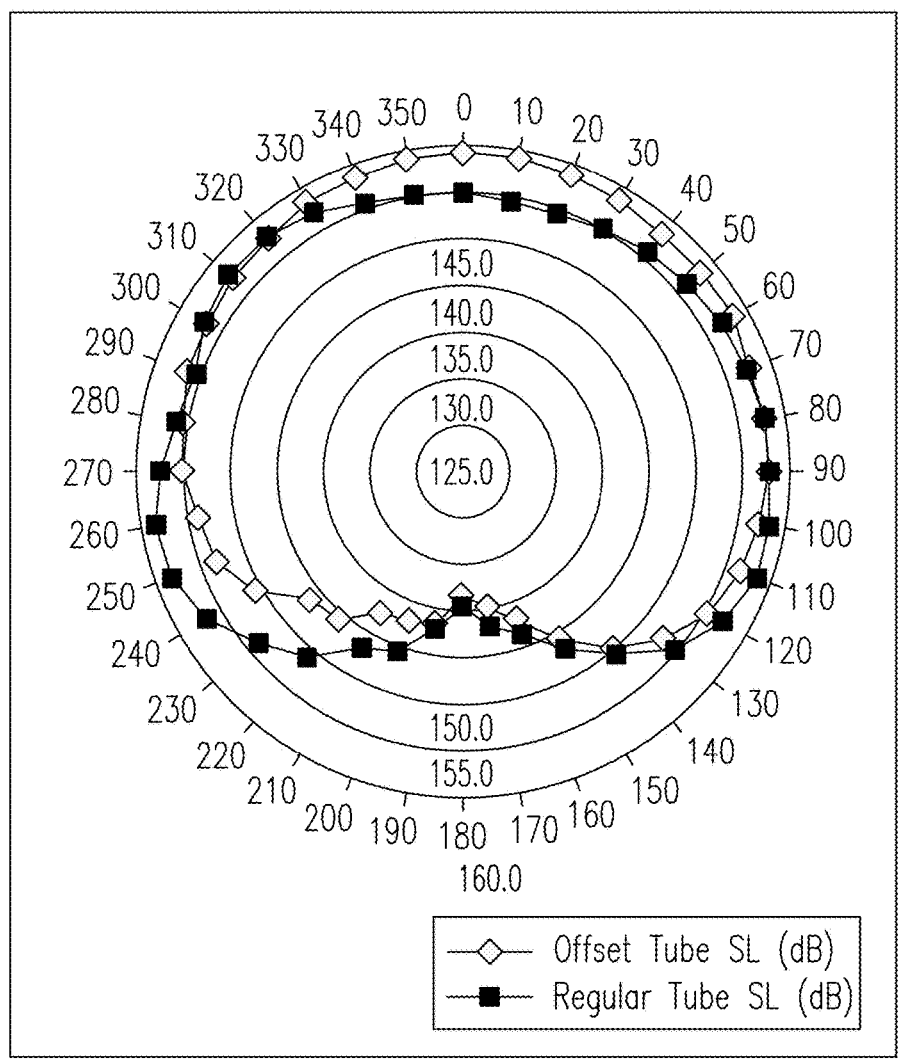
FIG. 8 compares beam patterns for an offset (non-concentric) piezoelectric transducer of the present invention against a conventional (concentric) piezoelectric transducer.

FIG. 8 compares beam patterns for an IC-offset (non-concentric) piezoelectric tube transducer (e.g., a model#610HD PZT tube transducer, TRS Technologies Inc., State College, Pa., USA) used in concert with the present invention against a conventional (concentric) piezoelectric transducer. In the test configuration, the inner circumference of the IC-offset piezoelectric tube transducer was offset from the tube center by 0.15 mm. Results show acoustic energy (source level output) delivered to the front 180° (i.e., from 0° to 90° and from 270° to 0°) of the injectable tag is enhanced. Acoustic energy (source level output) delivered from the front of the piezoelectric tube transducer provides a beam pattern that is preferably omnidirectional at least over the front 180° of the wavefront. Acoustic energy delivered to the rear 180° (i.e., from 90° to 270°) is reduced. The IC-offset can be tailored to enhance the acoustic signal emitted towards the front of the tag up to the mechanical limits of the piezoelectric material.

Beam pattern may also be affected by the shape of the epoxy coating on the piezoelectric transducer, dimensions of electronic components positioned behind the piezoelectric transducer, and the gap or spacing behind or between the piezoelectric transducer and other electronic components. Tests show that electronic components positioned behind the piezoelectric transducer with a height dimension greater than 1 mm can generate a beam pattern with acoustic outputs that are lower on two or more sides of the tag. Thus, to achieve an omnidirectional beam pattern, the epoxy coating on the tube piezoelectric transducer should be thin (<0.2 mm). The coating should also conform to the outer surface of piezoelectric transducer to minimize irregularities in the coating which can cause fluctuations in the source level leading to non-uniform beam patterns. Wavefront effects stemming from interactions between emitted and reflected acoustic waves can be minimized by inserting a reflector behind the piezoelectric transducer as described herein.

Figure 9:
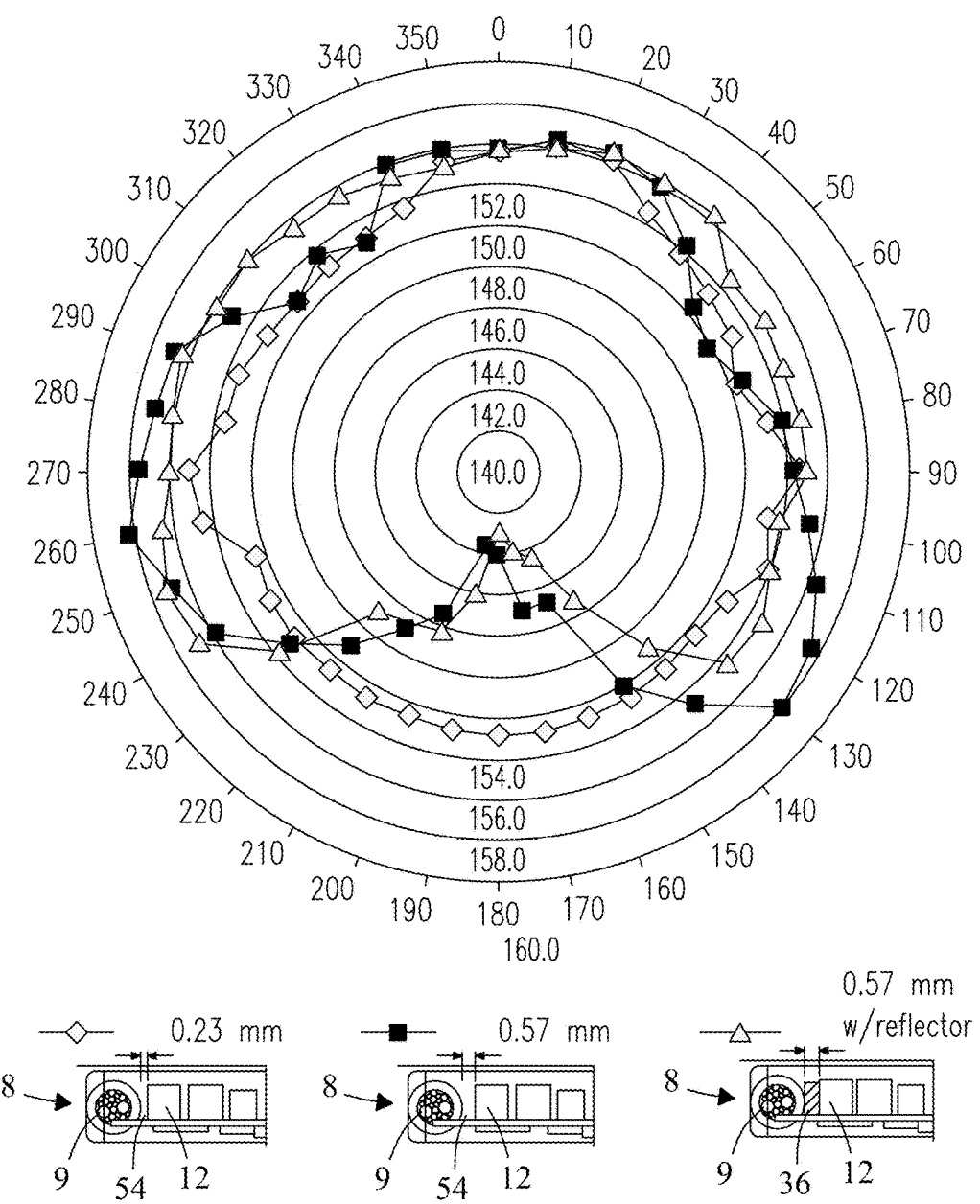
FIG. 9 compares beam patterns of injectable tags of the present invention that include various spacing widths positioned behind the piezoelectric transducers.

FIG. 9 shows exemplary beam patterns for injectable acoustic tags of the present invention. A separation gap 54 positioned directly behind the piezoelectric transducer and a (e.g., 1.6 mm tall) inductor (FIG. 1a) may include various selected width or spacing dimensions (e.g., 0.23 mm and 0.57 mm). In some embodiments, the tag may be equipped with an acoustic reflector 36 composed of, e.g., EPDM closed-cell foam which may be placed within gap 54 to improve the beam pattern of the tag. In exemplary embodiments, tags equipped with an acoustic reflector 36 placed within the gap 54 show a beam pattern with a 180° wavefront (i.e., from 0° to 90° and from 270° to) 0° that becomes more uniform as the gap spacing between the piezoelectric transducer and inductor 12 (or another component) increases. Results may be attributed to reflection of acoustic waves by the acoustic reflector from adjacent electronic components back towards the piezoelectric transducer. The reflector also dampens acoustic waves within gap 54. Tests show acoustic energy emitted from the back of the piezoelectric transducer (i.e., facing the circuit board) is less likely to be detected because of the location of hydrophones relative to the piezoelectric transducer. Redirection of acoustic energy by the acoustic reflector to the front end of the piezoelectric transducer enhances the detection probability.

Encapsulation of Tag Components

Figure 10:
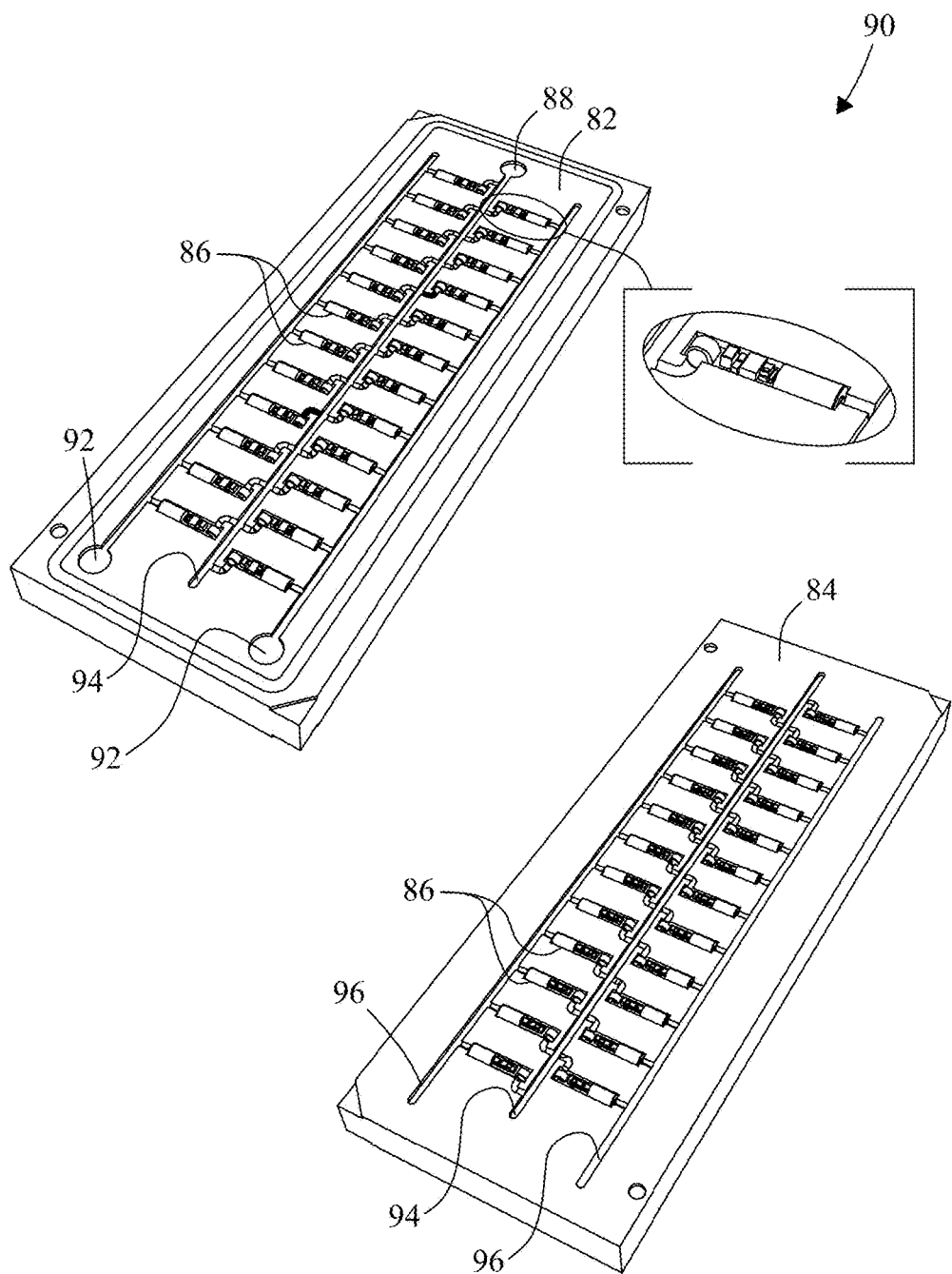
FIG. 10 shows a top and a bottom portion of an injection mold for encapsulation of injectable tags of the present invention.

FIG. 10 shows an exemplary metal tag mold 90 for encapsulation of assembled tags. Tag mold 90 may include a top portion 82 and a bottom portion 84 constructed, e.g., of aluminum metal, with cavities 86 in respective half portions that are mirror images of the other into which assembled tags may be positioned. In the exemplary embodiment, mold 90 may include an at least one inlet 88 and two outlets 92. Epoxy resin may be flowed through mold 90 using a process such as a vacuum forming process or an injection forming process. A releasing agent (e.g., DC20, Dow Corning, Midland, Mich., USA) at a dilute concentration of about 1 part of DC20 in 5 parts Xylene) may be applied to the surface of the cavities 86 of tag mold 90 to allow easy release of encapsulated tags after the epoxy has cured.

In some embodiments, a vacuum forming process may be used. Vacuum may be pulled from the outlets 92 of mold 90 to create a pressure differential that allows the epoxy to flow. Flow of epoxy flow is "guided" by the vacuum through all the cavities 86. Mold 90 is sealed to prevent air pockets from being introduced into the coating surrounding components of the tag. Mold 90 may be configured such that epoxy flows into each cavity 86 from the piezoelectric transducer (FIG. 1a) end of the tag and flows out of the mold 90 at the battery end (FIG. 1a) of the tag to allow the piezoelectric transducer and the electronics to be fully covered. Flow around the micro-battery (the largest component) can be greatest resistance to the flow of epoxy and hence the largest pressure drop. An O-ring (ID=146 mm) may be employed in the mold to provide sealing. Epoxy entry ducts 94 for individual cavities 86 may be placed on either of two flat opening ends of the piezoelectric tube transducer (not directly on the curved surface of the piezoelectric transducer) to prevent introducing uneven surfaces in the piezoelectric transducer coating of the finished tag that can lower the source level of the acoustic signal.

In some applications, injection forming may be used. Epoxy may be mechanically pushed through the mold 90 with, e.g., a syringe pump (not shown). Epoxy may be introduced through the inlet 88, through all cavities 86 of the mold 90, and out of the mold 90 through outlets 92 after passing through the cavities 86 on each either side of the mold 90. Air may be pushed out of the mold 90 by flowing epoxy, which also prevents air from being introduced back into mold 90. Flow may be guided by the mold design. For purposes of uniformity, each cavity 86 of the mold 90 is preferably filled with either tag components to be encapsulated or a filler such as modeling clay for empty cavities. Filling empty cavities prevents epoxy resin from flowing preferentially into the empty cavities and promoting formation of air pockets in tags positioned in other cavities.

Optimal rates for infusion of epoxy resin depends in part on the type of epoxy employed. Resins suitable for use include thermosetting epoxies such as, e.g., EPO-TEK 301 or Electrical Resin 5. Both epoxies can be used to encapsulate the tag with a selection of a suitable injection rate. A minimum injection rate of about 10 mL/min provides a flow that effectively encapsulates the tag components. Setting mold 90 in a vertical position can also assist with removal of air pockets inside the mold.

Coding and Activation

Injectable tags may be programmed with one or more tag codes of a selectable code length. Each tag code may be configured with a same or a different tag identification (ID) code. Each ID code may include an (n)-bit tag ID length. In exemplary embodiments described herein, each of the one or more tag codes has a length of 31 binary bits, and is comprised of a 7-bit (i.e., length) "Barker" code, a 16-bit tag ID code, and an 8-bit cyclic redundancy check (CRC). The CRC is an error-detection code transmitted as a portion of the tag code commonly used to detect changes to raw data. Transmitted data may be appended with a short CRC (i.e., data verification) value of a fixed (e.g., a 3-bit up to 8-bit) length. When data is retrieved, the CRC calculation may be repeated to ensure data is not corrupted.

Format of the one or more tag codes is configurable. The configurable format allows each tag to have various and different user-defined encoding configurations suitable for various applications. For example, number and length of the tag codes are configurable. In various embodiments, injectable acoustic tags of the present invention may each include one or more tag codes each with a selectable code length of up to 64 bits. In some embodiments, the controller may alternate between the two tag codes, a first code in a first cycle and a second code in a second cycle, each with their respective ID codes. Alternating between two tag codes increases the number of possible unique binary tag identifications (IDs) while maintaining backward compatibility with existing receiver equipment. If each tag code contains a 16-bit tag ID code, two tag codes provide a total of $2^{16}$ times $2^{16}$, or over 4 billion unique IDs. Tags of the present invention may also transmit similar or the same codes in every cycle so as to be backward compatible with existing JSATS tags. For example, in applications where a single tag ID code is desired, both may be coded to the same value. Other numbers of tag codes may be employed without limitation.

Tags may be configured and activated with all required operating parameters by connecting the infra-red programmer (FIG. 3b) to the serial port on a computer (not shown), positioning an IR LED on the IR programmer within a distance of 1 cm from the tag phototransistor (FIG. 3b) and powering the IR programmer. The programming script on the host computer may be run, which sends commands serially to the IR programmer through the serial port to the controller which configures the tag. Programming times are about 10 seconds or less on average. The LED on the IR programmer may turn "off" when the configuration is complete. Tags may be placed in storage mode and stored in a dark box until being readied for injection. When used, the tag may be reconfigured to place the microcontroller in transmit or hibernate mode.

Tag codes of the present invention can also transmit data from various sensors included in the tag. In various embodiments, e.g., the microcontroller or the tag may contain an internal temperature sensor or other sensors. In some embodiments, the microcontroller may contain an internal temperature sensor. In some embodiments, partial codes can be used to embed temperature and/or other sensor measurements into the transmission codes. For example, when a temperature sensor is used, temperature data may be collected in the host animal and encoded as a partial component (e.g., as a 5-bit temperature value) which may be incorporated as a component of a full (e.g., second) tag code, which may then be encoded and transmitted from the tag in the acoustic signal to the receiver. As an example, when encoding a temperature measurement, a first primary code may include, e.g., a 7-bit barker code, a 16-bit ID code (with a unique ID), and an 8-bit CRC. The primary code may be followed by a secondary code containing a partial ID code with the temperature data, e.g., a 7-bit Barker code, an 11-bit secondary tag ID, a 5-bit temperature code, and an 8-bit CRC.

In some embodiments, the temperature sensor may provide an analog output [e.g., a numeric value from 0 to 31 (not the actual temperature in ° C.) that increases with temperature] that depends on the battery voltage. In such applications, the microcontroller may measure both the temperature value and the battery voltage simultaneously and then perform on-board arithmetic to compensate for any offsets between measured and actual temperature values and the battery voltage. Because CRCs can change as a result of updated temperature bits, the microcontroller may be configured to specify 32 CRC codes, each 8 bits long, for use with the temperature feature. The tag can transmit the appropriate CRC code at the end of the transmission of the ID code.

Injection Procedure

Injection of injectable acoustic tags minimizes time required to tag individual host animals and minimizes negative biological effects resulting from surgical implantation in the host animal. While an 8-gauge syringe needle is preferably employed, the invention is not intended to be limited thereto. Plunger of the syringe needle may be spring loaded so that air liquids are not required to perform injections. Air is sufficient to inject the injectable tag into the host animal. Preferred locations for injection of the injectable tag minimize damage to the host animal. In fish, for example, injections may be made at a point where the tip of the pectoral fin lies against the body, e.g., about 2 mm to 3 mm dorsal of the linea alba, a fibrous connective tissue that runs down the midline of the abdomen that does not contain primary nerves or blood vessels. However, injection sites are not limited.

Tracking

Injectable acoustic tags of the present invention may be used to remotely track host animals in one, two, and/or three dimensions. Tracking as described, e.g., by Deng et al. (*Sensors* 2011, 11, 5661-5676) may be employed, which reference is incorporated herein in its entirety.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many changes, modifications, and equivalent arrangements can be made without departing from the invention in its broader aspects, the scope being accorded the broadest interpretation relative to the appended claims so as to encompass all equivalent structures and products. The appended claims are therefore intended to cover all such changes and modifications as fall within the scope of the invention.

The invention claimed is:

1. An injectable acoustic transmission device, comprising:
an injectable containment vessel that defines an internal volume below about 115 $mm^3$ for containing components in a configuration and dimensions that allows the injectable acoustic transmission device to be injectable;
a power source configured to power operation of the injectable acoustic transmission device over a duration of greater than about 30 days of full-time activity at a selected transmission rate;
a controller configured to supply one or more tag codes, each tag code having a selectable code length up to 64-bits and including an identification (ID) code of a selectable bit length therein;
at least one piezoelectric transducer disposed at an end of the containment vessel configured to transmit an acoustic signal containing the one or more tag codes and their respective identification codes encoded therein to a receiver disposed external to the injectable acoustic transmission device; and
wherein at least one of the at least one piezoelectric transducers includes an inner wall and an outer wall each with a surface electrode, and wherein the inner wall is offset with respect to the outer wall in a direction towards a transmission direction of the injectable acoustic transmission device by a distance selected to enhance the acoustic signal in the transmission direction.

2. The device of claim 1, further comprising one or more sensors within the device, and wherein at least one of the one or more tag codes includes numeric data collected from the one or more sensors within the device.

3. The device of claim 2, wherein the one or more sensors includes a temperature sensor, and wherein the numeric data is temperature data collected from the temperature sensor.

4. The device of claim 1, wherein the at least one of the at least one piezoelectric transducers includes an inner circumference and an outer circumference and a center of the inner circumference is offset relative to the center of the outer circumference in the direction towards the transmission direction.

5. The device of claim 1, further including an acoustic reflector positioned behind the at least one piezoelectric transducer configured to enhance the acoustic signal by at least about 0.5 dB when released in the transmission direction compared with the device absent the acoustic reflector.

6. The device of claim 5, wherein the acoustic reflector comprises a closed-cell foam of a selected width that enhances the acoustic signal emitted from the at least one piezoelectric transducer in the transmission direction.

7. The device of claim 6, wherein the acoustic reflector includes a width dimension not greater than about 1/6 of the outer circumference of the at least one piezoelectric transducer.

8. The device of claim 5, wherein the acoustic reflector yields a substantially uniform beam pattern comprising 180° of the transmission wavefront delivered from the at least one transducer in the transmission direction.

9. The device of claim 1, wherein the device with a single piezoelectric transducer includes a total weight below about 220 mg.

10. The device of claim 1, wherein the injectable containment vessel has a length at or below about 15.0 mm, and a diameter at or below about 3.4 mm.

11. The device of claim 1, wherein the acoustic signal has a source level output greater than about 153 dB (re: 1 µPa @ 1 meter).

12. The device of claim 1, wherein the controller is configured to automatically adjust the energy drawn from the power source as the power source discharges such that the acoustic source level remains substantially constant over a majority of the operation lifetime of the device.

13. The device of claim 1, wherein the controller is configured to supply two or more tag codes to the at least one piezoelectric transducer.

14. The device of claim 1, wherein the controller generates the acoustic waveform using a configurable number of cycles for each bit of the one or more tag codes, and wherein the configurable number of cycles for each bit of the one or more tag codes is selected corresponding to use of the device in one of a plurality of different applications.

15. The device of claim 1, wherein the device includes an infrared component that optically links the controller to a host computer, the infrared component receives coding and programming instructions that configure the controller for operation when the injectable acoustic transmission device is injected into the host animal.

16. The device of claim 1, wherein the device includes an active lifetime of at least about 35 days at a pulse rate interval (PRI) of 5 seconds.

17. The device of claim 1, wherein the at least one piezoelectric transducer includes a "breathing mode" resonance frequency of 416.7 kHz.

18. The device of claim 17, wherein the "breathing mode" resonance frequency is from about 10 kHz to about 50 kHz higher than the drive signal frequency that compensates for the downshift in the resonance frequency caused by coating layers on the surface of the at least one piezoelectric transducer when the acoustic signal is emitted therefrom.

19. The device of claim 1, wherein the at least one piezoelectric transducer includes end caps composed of a selected metal disposed at respective flat ends of the at least one piezoelectric transducer configured to enhance the acoustic signal emitted from the ends thereof.

20. The device of claim 1, wherein the power source (battery) includes a plurality of laminates configured to supply an output voltage of at least about 2.5 volts, each laminate includes an anode with a cathode disposed between a polymer separator that electrically isolates the cathode from the anode in the laminate, and an electrolyte.

21. The device of claim 20, wherein the separator comprises micro-porous polypropylene.

22. The device of claim 20, wherein the cathode comprises carbon fluoride and a conducting carbon within a binder affixed at a selected thickness to a current collector.

23. The device of claim 22, wherein the cathode includes 85 wt % carbon fluoride, 10 wt % carbon, and 5 wt % polytetrafluoroethylene (PTFE) binder.

24. The device of claim 20, wherein the current collector includes a metal mesh comprised of aluminum or an aluminum-containing alloy.

25. The device of claim 20, wherein the anode comprises lithium metal of a selected thickness and a selected weight.

26. The device of claim 20, wherein the plurality of cathode/anode laminates are enclosed within a container comprising a high mechanical strength and chemically resistant polymer of a selected thickness.

27. The device of claim 20, wherein the electrolyte comprises a selected concentration of lithium hexafluorophosphate ($LiPF_6$) disbursed in a selected volume ratio of ethylene carbonate (EC) and dimethyl carbonate (DMC) that minimizes voltage drops within the power source during operation.

28. A method for transmission of location and identification information from a host animal in real-time or as a function of time, the method comprising:
   injecting the injectable acoustic transmission device of claim 1 at a selected location in the body of the host animal;
   transmitting an acoustic signal from the injectable acoustic transmission device disposed within the body of the host animal encoded with one or more tag codes of a code length up to about 64 bits, each tag code including an identification code of a selectable code length encoded with at least identification data that is transmitted to a receiver disposed external to the host animal; and
   decoding the acoustic signal received from the injectable acoustic transmission device to identify and track the host animal in up to three dimensions in real-time or as a function of time.

29. The method of claim 28, wherein the transmitting includes alternately transmitting the one or more tag codes one after the other in succession.

30. The method of claim 28, wherein the transmitting further includes transmitting numeric data from one or more sensors in at least one of the one or more tag codes transmitted from the injectable acoustic transmission device.

31. The method of claim 28, further including programming the injectable acoustic transmission device for operation via an optical link in the injectable acoustic transmission device.

32. The method of claim 31, wherein the programming includes configuring the injectable acoustic transmission device to automatically adjust the energy drawn from the power source as the power source discharges such that the acoustic source level remains substantially constant over the majority of the operation lifetime of the device.

33. The device of claim 1, further comprising a temperature sensor, and wherein the at least one piezoelectric transducer is configured to transmit the acoustic signal containing temperature data collected from the temperature sensor and plural ones of the one or more tag codes at different moments in time.

34. The device of claim 1, wherein the at least one piezoelectric transducer is configured to transmit the acoustic signal which alternately contains plural ones of the one or more tag codes.

35. The device of claim 1, wherein the at least one piezoelectric transducer is configured to transmit the acoustic signal which contains one of plural ones of the one or more tag codes at one moment in time and another of the one or more tag codes at another moment in time.

36. The device of claim 1, wherein the selectable code length of each of the one or more tag codes and the selectable bit length of each of the identification (ID) codes are selected corresponding to use of the device in one of a plurality of different applications.

37. The device of claim 1, wherein the inner wall is offset with respect to the outer wall in the direction towards the transmission direction of the injectable acoustic transmission device in the absence of a drive signal which drives the at least one piezoelectric transducer.

38. The device of claim 1, wherein the inner wall has an inner diameter of about 1.7 mm to about 1.9 mm, the outer wall has an outer diameter of about 2.4 mm to about 2.6 mm, and the inner wall is offset with respect to the outer wall by the distance of about 0.15 mm.

39. The device of claim 1, wherein the inner wall is offset with respect to the outer wall when the at least one of the at least one piezoelectric transducers is assembled into the injectable acoustic transmission device.

40. The device of claim 1, wherein the at least one piezoelectric transducer is activated along a thickness direction.

41. The device of claim 1, wherein the vessel has a narrowed front end compared with a back end thereof, and the at least one of the at least one piezoelectric transducers is adjacent to the narrowed end of the vessel.

* * * * *

UNITED STATES PATENT AND TRADEMARK OFFICE
CERTIFICATE OF CORRECTION

| | |
|---|---|
| PATENT NO. | : 10,033,469 B2 |
| APPLICATION NO. | : 14/014035 |
| DATED | : July 24, 2018 |
| INVENTOR(S) | : Z. Daniel Deng et al. |

It is certified that error appears in the above-identified patent and that said Letters Patent is hereby corrected as shown below:

On the Title Page

(71) Applicants: Replace - "The United States of America, as represented by the Army Corps of Engineers, Washington, DC (US)" with --Army Corps of Engineers, Alexandria, VA (US)--

(73) Assignees: Replace - "The United States of America, as represented by the Army Corps of Engineers, Washington, DC (US)" with --Army Corps of Engineers, Alexandria, VA (US)--

Column 2, Line 17 (56) References Cited - Replace "CN 1424592 8/2003" with --CN 1424592 6/2003--

Page 4, Column 2, Line 69 (56) References Cited - Replace "WO PCT/US2015/062200 IPRP, dated Jun. 29, 2017, Battelle Memorial Institute." with --WO PCT/US2015/062200 IPRP, dated Aug. 29, 2017, Battelle Memorial Institute.--

In the Specification

Column 18, Line 32 - Replace "270° to) 0°" with --270° to 0°)--

Signed and Sealed this
Thirtieth Day of April, 2019

Andrei Iancu
*Director of the United States Patent and Trademark Office*

UNITED STATES PATENT AND TRADEMARK OFFICE
CERTIFICATE OF CORRECTION

PATENT NO. : 10,033,469 B2
APPLICATION NO. : 14/014035
DATED : July 24, 2018
INVENTOR(S) : Z. Daniel Deng et al.

It is certified that error appears in the above-identified patent and that said Letters Patent is hereby corrected as shown below:

On the Title Page

(56) References Cited, 2$^{nd}$ Column, 11$^{th}$ Line - Replace:
"3,100,866 A 8/1963 Marks"
With:
--3,100,886 A 8/1963 Marks--

(56) References Cited, page 3, 1$^{st}$ Column, 4$^{th}$ Line - Replace:
"(CFx)n (0.33<x<9,66) in lithium batteries, Journal of Power"
With:
--(CFx)n (0.33<x<0.66) in lithium batteries, Journal of Power--

Signed and Sealed this
Eighteenth Day of July, 2023

Katherine Kelly Vidal
*Director of the United States Patent and Trademark Office*